(12) United States Patent
Ogasawara et al.

(10) Patent No.: US 7,738,024 B2
(45) Date of Patent: Jun. 15, 2010

(54) IMAGE PROCESSING METHOD, IMAGING APPARATUS, AND STORAGE MEDIUM STORING CONTROL PROGRAM OF IMAGE PROCESSING METHOD EXECUTABLE BY COMPUTER

(75) Inventors: Tsutomu Ogasawara, Funabashi (JP); Eiichiro Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/552,554

(22) Filed: Sep. 2, 2009

(65) Prior Publication Data

US 2009/0315997 A1 Dec. 24, 2009

Related U.S. Application Data

(62) Division of application No. 11/457,862, filed on Jul. 17, 2006, now Pat. No. 7,602,417.

(30) Foreign Application Priority Data

| | | |
|---|---|---|
| Aug. 5, 2005 | (JP) | 2005-227896 |
| Jun. 12, 2006 | (JP) | 2006-162215 |

(51) Int. Cl.
*H04N 5/222* (2006.01)
*H04N 5/262* (2006.01)
*H04N 5/225* (2006.01)
*G06K 9/00* (2006.01)

(52) U.S. Cl. .................. 348/333.03; 348/333.12; 348/239; 348/169; 382/118

(58) Field of Classification Search .................. 348/152, 348/154, 155, 208.14, 169, 333.01, 333.02, 348/333.03, 333.04, 333.11, 333.12, 239; 382/118, 106, 217; 340/990, 992, 995.1
See application file for complete search history.

(56) References Cited

U.S. PATENT DOCUMENTS

| | | | | |
|---|---|---|---|---|
| 6,005,493 | A * | 12/1999 | Taniguchi et al. | 340/990 |
| 7,023,469 | B1 * | 4/2006 | Olson | 348/152 |
| 7,274,387 | B2 * | 9/2007 | Gupta et al. | 348/152 |
| 7,298,412 | B2 * | 11/2007 | Sannoh et al. | 348/348 |
| 7,327,886 | B2 * | 2/2008 | Ito | 382/190 |
| 7,453,506 | B2 * | 11/2008 | Li | 348/333.12 |
| 7,469,055 | B2 * | 12/2008 | Corcoran et al. | 382/118 |
| 7,602,417 | B2 * | 10/2009 | Ogasawara et al. | 348/169 |
| 2007/0053551 | A1 * | 3/2007 | Kubo et al. | 382/106 |
| 2009/0322885 | A1 * | 12/2009 | Ogasawara et al. | 348/169 |

* cited by examiner

*Primary Examiner*—Tuan Ho
*Assistant Examiner*—Marly Camargo
(74) *Attorney, Agent, or Firm*—Canon U.S.A., Inc. I.P. Division

(57) ABSTRACT

An image processing method is provided for detecting the position of a specific subject from a movie and combining a display of detection result indicating the detected position with the movie. The image processing method includes a step of determining, depending on a display time of the detection result, whether the detection result should be continuously displayed, when the subject cannot be detected during the display of the detection result combined with the movie.

9 Claims, 14 Drawing Sheets

IMAGE PROCESSING METHOD, IMAGING APPARATUS, AND STORAGE MEDIUM STORING CONTROL PROGRAM OF IMAGE PROCESSING METHOD EXECUTABLE BY COMPUTER

CROSS REFERENCE TO RELATED APPLICATIONS

The present application is a divisional of U.S. patent application Ser. No. 11/457,862, filed Jul. 17, 2006, entitled "IMAGE PROCESSING METHOD, IMAGING APPARATUS, AND STORAGE MEDIUM STORING CONTROL PROGRAM OF IMAGE PROCESSING METHOD EXECUTABLE BY COMPUTER", the content of which is expressly incorporated by reference herein in its entirety. Further, the present application claims priority from Japanese Patent Application No. 2005-227896, filed Aug. 5, 2005; and Japanese Patent Application No. 2006-162215 filed Jun. 12, 2006, which are also hereby incorporated by reference herein in its entirety.

BACKGROUND OF THE INVENTION

1. Field of the Invention

The present invention relates to an image processing technique for repetitively detecting, from image data, an object satisfying predetermined conditions and displaying a detection result of the object.

2. Description of the Related Art

An imaging apparatus can repetitively detect, from image data, an object satisfying predetermined conditions, for example, to improve the following situations discussed herein below.

For instance, a camera may have an auto-focus function for automatically adjusting focus on a target subject to be photographed. In general, the camera selects one or plural focus detection areas, and adjusts the lens position of its imaging optics system to focus on a subject in the selected focus detection area. Then, the camera performs exposure compensation processing by enlarging a weighting factor applied to a brightness value of the main subject located in the focus detection area.

However, the focus detection area can occupy a relatively limited area on the screen. When the main subject is present outside the focus detection area, it is difficult to focus on the main subject. Furthermore, even if a main subject is present in the focus detection area, the focus adjusting action may be erroneously applied to another object different from the target (i.e., main subject). For example, when a subject in a different focus detection area is positioned more adjacently to a camera than the main subject, the camera may regard a different subject in another focus detection area as a main subject and may erroneously apply a focus adjusting action to this subject.

To avoid this drawback, it is possible to request a user to instruct a focus detection area where a main subject is present each time the user shoots the target, although it is not convenient for the user. In view of the above, Japanese Patent Application Laid-Open No. 2003-107335 discloses a camera that can automate the processes of detecting a main subject from obtained image data using a shape analysis, displaying a focus detection area corresponding to the detected main subject, and performing a focus adjusting action applied to the focus detection area.

According to the aforementioned camera, the image data is entirely searched to detect a main subject and accordingly the focus adjusting action can be applied to the main subject wherever the main subject is present in an object field. Furthermore, to momentarily track the main subject, the detecting action of the main subject based on the shape analysis must be performed periodically.

However, an apparatus capable of automatically detecting a main subject may erroneously select a subject that a user does not intend to shoot. Hence, it is necessary to let a user confirm a main subject detected by the camera.

Furthermore, a liquid crystal monitor or other display unit can continuously display image data to let a user observe the movement of a subject. In such a case, it is desirable to update the detection result of a main subject in accordance with a detected movement of the main subject. To this end, the processing for updating the detection result of a main subject should be performed periodically. And, the latest region where the main subject is present should be continuously displayed.

More specifically, when a main subject is detected, a frame indicating the position of a detected subject can be superimposed on an image captured by the camera. In this case, as a practical method for detecting a main subject, it is possible to detect a front or oblique face of a subject person based on the spatial relationship between both eyes, a nose, and a mouth on a face (refer to Japanese Patent Application Laid-Open No. 2002-251380).

However, according to the above-described detection method, if a subject person blinks and closes an eye or suddenly turns his/her face to look away, one eye will not be recognized on a captured image and accordingly the camera will fail in detecting a main subject. As a result, as shown in FIG. 14, the frame indicating the detected region will temporarily disappear from the monitor screen, whereas the main subject remains at the same place.

For example, posing for a while is hard for a child who is waiting for completion of a shot. Thus, if the above-described method is used to detect a child, the camera may temporarily fail in detecting a main subject. Such drawbacks will induce an undesirable phenomenon repeating the display and erasure of the frame indicating the position of a main subject in a short period of time. In this situation, the image displayed on a display unit will be unstable and a user will be unable to surely observe the movement of a subject.

Similar problems will commonly arise when a main subject is repetitively detected from a movie or from continuously changing image data and a detection result is displayed on a display unit.

Also it is noted that the above-described problems are not limited to cameras or other image capturing devices. For example, similar problems will arise in application software that can detect a target object from transferred movie data and display a detection result.

Therefore it would be desirable to provide an apparatus which has a function for repetitively detecting, from image data, an object satisfying predetermined conditions, and of which further can stably display a detection result even when a target object cannot be temporarily detected

SUMMARY OF THE INVENTION

The present invention is directed to an apparatus having a function of repetitively detecting, from image data, an object satisfying predetermined conditions, and can stably display a detection result even when a target object cannot be temporarily detected.

According to an aspect of the present invention, an image processing method is provided which includes repetitively updating image data; displaying an image based on the image data; detecting an object satisfying predetermined conditions from the image data; combining a display of detection result indicating a region where the object is detected with a display of the image; and determining whether the display of detection result should be continued, when the object cannot be detected during the display of detection result.

According to another aspect of the present invention, the image processing method may further include measuring a time when the detection result is continuously displayed; and determining based on a measurement result whether the detection result should be continuously displayed. According to another aspect of the present invention, the display of the detection result is canceled when the measurement result reached a predetermined time.

According to yet another aspect of the present invention, the measurement result is reset when the object can be detected during the display of the detection result. Moreover, according to yet another aspect of the present invention, the predetermined time is changeable in accordance with a position of the detected object in the image. Further, according to still another aspect of the present invention, the closer the position of the detected object is to an edge of the image, the shorter the predetermined time is set.

According to another aspect of the present invention, the predetermined time is changeable in accordance with a size of the detected object. And according to another aspect of the present invention, the larger the size of the detected object is, the shorter the predetermined time is set. Furthermore, in another aspect of the present invention, the image processing method may further include determining, based on a moving direction of the detected object, whether the detection result should be continuously displayed.

And, according to another aspect of the present invention, the image processing method may further include determining whether the detection result should be continuously displayed, based on a moving direction of the detected object and a position of the detected object in the image. Additionally, according to yet another aspect of the present invention, the image processing method may further include detecting a change amount of the image data in response to the update of the image data; and determining, based on a detection result, whether the detection result should be continuously displayed.

Moreover, according to another aspect of the present invention, the image processing method may further include detecting a change amount of the image data in response to the update of the image data; and resetting the measurement result in accordance with the change amount.

Additionally, according to another aspect of the present invention, an imaging apparatus is provided which includes an imaging element configured to produce image data based on light reflected from a subject; a detection circuit configured to detect an object satisfying predetermined conditions from the image data obtained from the imaging element; a display unit configured to repetitively obtain the image data and display an image based on the obtained image data, and configured to combine the image with a detection result indicating a region where the object detected by the detection circuit is present; and a signal processing circuit configured to determine whether the detection result should be continuously displayed on the display unit when the detection circuit cannot detect the object while the display unit displays the detection result.

Further, according to another aspect of the present invention, the display unit combines a movie and the detection result. And, according to another aspect of the present invention, the imaging apparatus may further include a focus control circuit that performs auto-focus processing applied to the object detected by the detection circuit. Additionally, according to another aspect of the present invention, the imaging apparatus may further include a focus control circuit that performs exposure control applied to the object detected by the detection circuit.

Moreover, according to another aspect of the present invention, the imaging apparatus may further comprising a timer that measures a time when the detection result is continuously displayed, wherein the signal processing circuit determines based on a measurement result of the timer whether the detection result should be continuously displayed. Also, according to another aspect of the present invention, the signal processing circuit cancels the display of the detection result when the measurement result reached a predetermined time. And still yet, according to another aspect of the present invention, the signal processing circuit resets the measurement result of the timer in response to a detection of the object by the detection circuit when the display unit displays the detection result.

Additionally, according to another aspect of the present invention, a computer readable medium is provided which contains computer-executable instructions for performing processing of image data. Here, the medium includes computer-executable instructions for repetitively updating image data; computer-executable instructions for displaying an image based on the image data; computer-executable instructions for detecting an object satisfying predetermined conditions from the image data; computer-executable instructions for combining a display of detection result indicating a region where the object is detected with a display of the image; and computer-executable instructions for determining whether the display of detection result should be continued, when the object cannot be detected during the display of detection result.

Furthermore, according to another aspect of the present invention, the computer readable medium may further include computer-executable instructions for measuring a time when the detection result is continuously displayed; and computer-executable instructions for determining based on a measurement result whether the detection result should be continuously displayed. Still yet, according to another aspect of the present invention, the display of the detection result is canceled when the measurement result reached a predetermined time. And finally, in another aspect of the present invention, the measurement result is reset when the object can be detected during the display of the detection result.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate various embodiments, features and aspects of the present invention and, together with the description, serve to explain the principles of the invention.

DETAILED DESCRIPTION OF THE EMBODIMENTS

The following description of various exemplary embodiments, features and aspects of the present invention is merely illustrative in nature and is in no way intended to limit the invention, its application, or uses.

First Exemplary Embodiment

Figure 1:
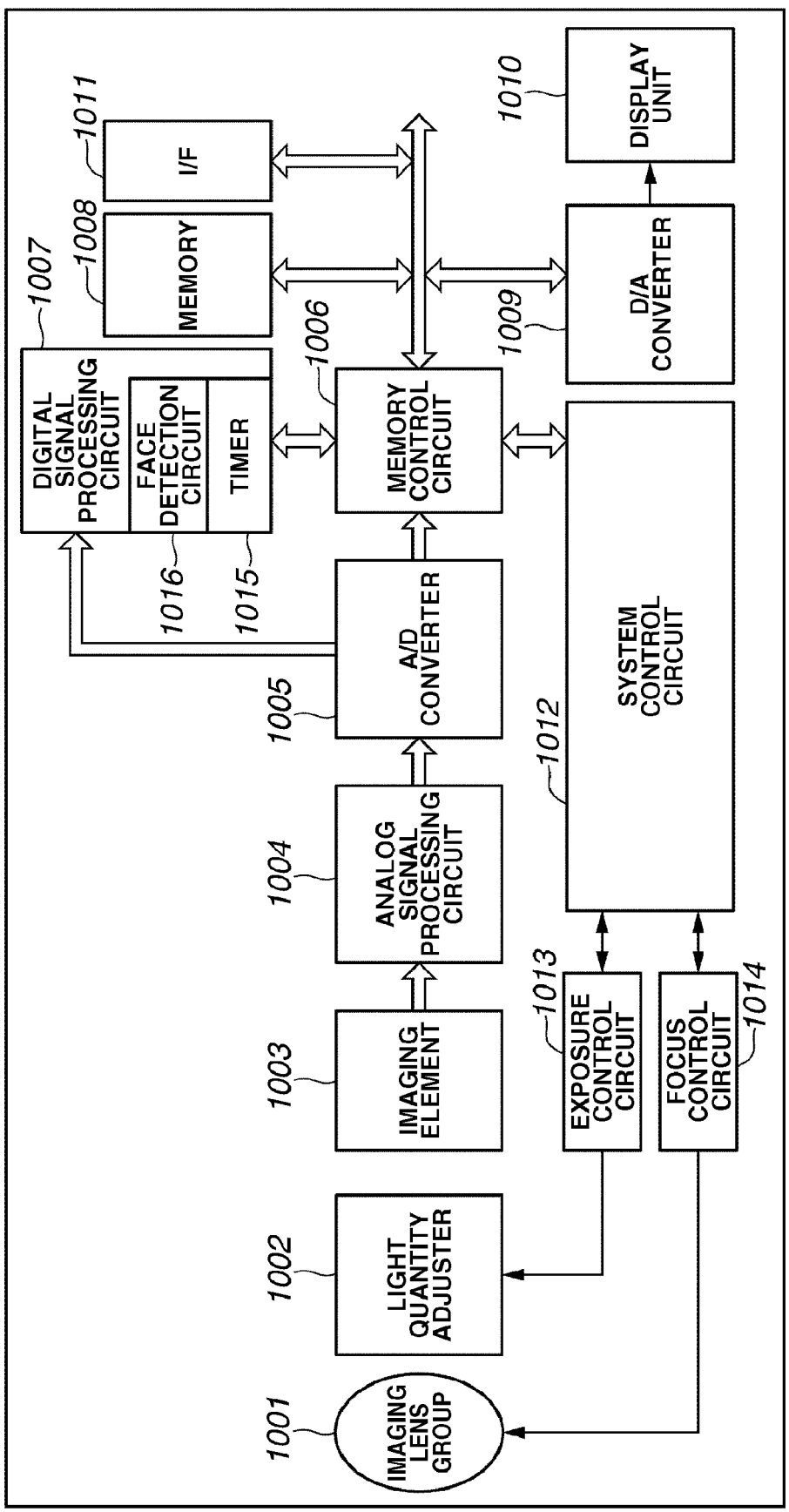
FIG. 1 is a block diagram illustrating a schematic arrangement of an exemplary imaging apparatus in accordance with a first exemplary embodiment of the present invention.

FIG. 1 is a block diagram illustrating an imaging apparatus 1000 in accordance with an exemplary embodiment of the present invention. In the present exemplary embodiment, the imaging apparatus 1000 is an electronic still camera.

The imaging apparatus 1000 includes an imaging lens group 1001, a light quantity adjuster 1002 including a diaphragm apparatus and a shutter apparatus, an imaging element 1003 (e.g., CCD or CMOS) that can convert light flux (i.e., subject image) having passed through the imaging lens group 1001 into an electric signal, and an analog signal processing circuit 1004 that can apply clamp processing and gain processing to an analog signal produced from the imaging element 1003.

Furthermore, the imaging apparatus 1000 includes an analog/digital (hereinafter, referred to as A/D) converter 1005 that can convert an output of the analog signal processing circuit 1004 into a digital signal, and a digital signal processing circuit 1007 that can apply pixel interpolation processing and color conversion processing to the data produced from the A/D converter 1005 or to the data produced from the memory control circuit 1006. The digital signal processing circuit 1007 can also perform calculation based on captured image data.

Furthermore, the imaging apparatus 1000 includes a system control circuit 1012 that can control, based on calculation results obtained by the digital signal processing circuit 1007, a through-the-lens (TTL) type auto focus (AF) processing, auto exposure (AE) processing, and pre-flash (EF) processing, applied to an exposure control circuit 1013 and a focus control circuit 1014.

Furthermore, the digital signal processing circuit 1007 can apply predetermined calculation processing to the captured image data, and execute a TTL-type auto white balance (AWB) processing based on obtained calculation results.

Moreover, the digital signal processing circuit 1007 includes a face detection circuit 1016 that can detect features of a face from the captured image data based on the detection of edges of eyes, a mouth, or the like. The face detection circuit 1016 can execute face detection processing for detecting a region corresponding to a human face. Furthermore, the digital signal processing circuit 1007 includes a timer 1015 that can measure a display time for each of later-described individual face detection frames.

A memory control circuit 1006 can control the analog signal processing circuit 1004, the A/D converter 1005, the digital signal processing circuit 1007, a memory 1008, and a digital/analog (hereinafter, referred to as D/A) converter 1009. The digital data produced from the A/D converter 1005 can be written, via the digital signal processing circuit 1007 and the memory control circuit 1006, into the memory 1008. Alternatively, the digital data produced from the A/D converter 1005 can be written, via the memory control circuit 1006, into the memory 1008.

The memory 1008 can store data to be displayed on a display unit 1010. The data recorded in the memory 1008 can be outputted, via the D/A converter 1009, to the display unit 1010 such as a liquid crystal monitor that can display an image based on the received data.

Furthermore, the memory 1008 can store captured still images and movies, with a sufficient storage capacity for a predetermined number of still images and a predetermined time of movies. In other words, a user can shoot continuous still images or can shoot panoramic images, because the memory 1008 enables writing large-sized image data at higher speeds. Furthermore, the memory 1008 can be used as a work area of the system control circuit 1012.

The display unit 1010 can function as an electronic viewfinder that successively displays captured image data. The display unit 1010 can arbitrarily turn the display on or off in response to an instruction given from the system control circuit 1012. When the display unit 1010 is in an OFF state, the imaging apparatus 1000 can reduce electric power consumption. Furthermore, the display unit 1010 can display an operation state and a message with images and letters in accordance with the operation of the system control circuit 1012 that can execute the program(s).

An interface 1011 can control communications between the imaging apparatus 1000 and a storage medium (e.g., a memory card or a hard disk). The imaging apparatus 1000 can transfer or receive image data and management information via the interface 1011 to or from a peripheral device (e.g., other computer or a printer).

It is also noted that the interface 1011 can be configured to be able to operate in conformity with the protocol of a PCM-CIA card or a Compact Flash (registered trademark) card, various types of communication cards can be inserted into card slots of the interface 1011. For example, the communication card can be selected from a LAN card, a modem card, a USB card, an IEEE1394 card, a P1284 card, a SCSI card, and a PHS card.

The system control circuit 1012 can control the operation of the imaging apparatus 1000. The system control circuit 1012 includes a memory that can store numerous constants, variables, and program(s) used in the operation of the system control circuit 1012.

The exposure control circuit 1013 can control the diaphragm apparatus and the shutter apparatus equipped in the light quantity adjuster 1002. The focus control circuit 1014 can control a focusing action and a zooming action of the imaging lens group 1001. The exposure control circuit 1013 and the focus control circuit 1014 can be controlled according to the TTL-type. The system control circuit 1012 controls the exposure control circuit 1013 and the focus control circuit 1014, based on calculation results obtained by the digital signal processing circuit 1007 based on the captured image data.

FIGS. 2 through 5 are flowcharts showing exemplar operations of the electronic camera in accordance with the present exemplary embodiment. The program for executing the processing is stored in the memory of the system control circuit 1012 and can be executed under the control of the system control circuit 1012.

Figure 2:
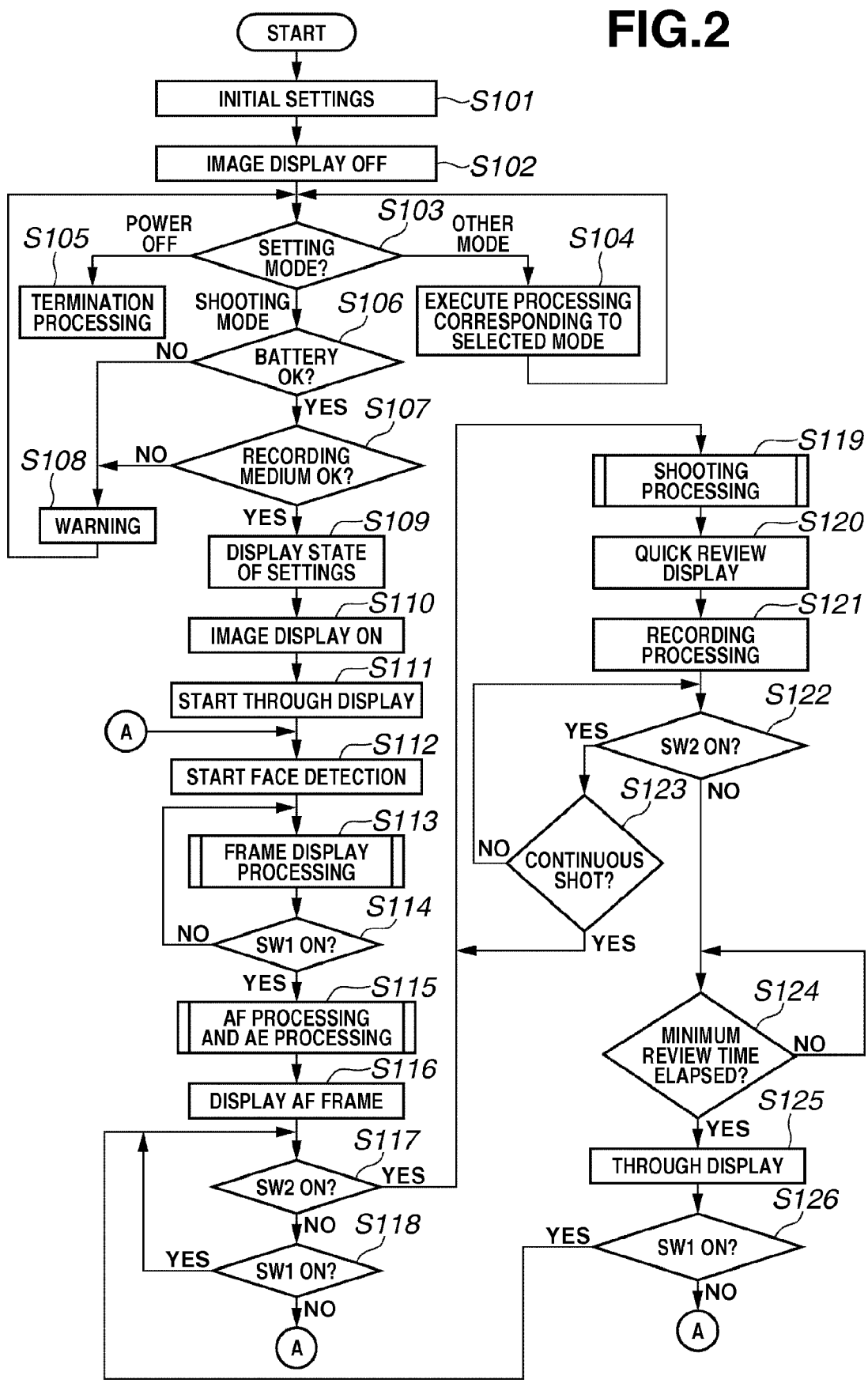
FIG. 2 is a flowchart showing an exemplary main processing routine in accordance with the first embodiment of the present invention.

FIG. 2 is a flowchart showing an exemplary main processing routine in the imaging apparatus 1000 in accordance with the present exemplary embodiment. The processing shown in FIG. 2 can be started, for example, in response to a turning-on operation of a power source immediately after the batteries are replaced.

First, in step S101, the system control circuit 1012 initializes various flags and control variables stored in its memory. In step S102, the system control circuit 1012 turns the image display of the display unit 1010 to an OFF state as initial settings. Next, in step S103, the system control circuit 1012 detects the state of operation mode set for the imaging apparatus 1000.

If the operation mode is POWER OFF, the processing flow proceeds to step S105. In step S105, the system control circuit 1012 changes the display of the display unit 1010 to a deactivated state and stores flags and control variables and other necessary parameters, setting values, and setting modes. Then, the system control circuit 1012 performs predetermined termination processing for turning off the power source of the display unit 1010 and other components in the imaging apparatus 1000.

When any other mode but a shooting mode is set in step S103, the system control circuit 1012 proceeds to step S104. In step S104, the system control circuit 1012 executes required processing corresponding to the selected mode and returns to step S103.

When the shooting mode is set in step S103, the processing flow proceeds to step S106. In step S106, the system control circuit 1012 determines whether a residual amount or an operation state of the power source is at a warning level which may cause the imaging apparatus 1000 to malfunction.

When the system control circuit 1012 decides that the power source is in the warning level (NO at step S106), the processing flow proceeds to step S108, where the system control circuit 1012 causes the display unit 1010 to perform a predetermined warning display with images and sounds. Then, the processing flow returns to step S103.

When the system control circuit 1012 decides the power source is not in the warning level in step S106 (YES at step S106), the processing flow proceeds to step S107. In step S107, the system control circuit 1012 determines whether an operation state of the storage medium is in a warning level according to which the imaging apparatus 1000 may fail especially in recording and playback of image data.

When the system control circuit 1012 decides that the storage medium is in the warning level (NO at step S107), the processing flow proceeds to the above-described step S108 to cause the display unit 1010 to perform a predetermined warning display with images and sounds. Then, the processing flow returns to step S103.

When the system control circuit 1012 decides that the storage medium is not in the warning level in the determination of step S107 (YES at step S109), the processing flow proceeds to step S109. In step S109, the system control circuit 1012 causes the display unit 1010 to display the state of various settings of the imaging apparatus 1000 with images and sounds.

Next, in step S110, the system control circuit 1012 turns the image display of display unit 1010 to an ON state, and causes the light quantity adjuster 1002 to open the shutter apparatus. Furthermore, in step S111, the system control circuit 1012 causes the display unit 1010 to start a through display according to which captured image data can be successively displayed as a movie.

In the through display state, the captured image data is successively written in the memory 1008 and the written data is successively displayed on the display unit 1010 to realize an electronic viewfinder function. In the present exemplary embodiment, the display unit 1010 can update the image display at intervals of $1/30$ second.

In step S112, the system control circuit 1012 causes the digital signal processing circuit 1007 to start the face detection processing for detecting a face region from the image data. As a technique for practically detecting a face region, various conventional methods are available.

For example, a neural network is a representative method for detecting a face region based on a learning technique. Furthermore, a template matching can be used to extract features representing eyes, a nose, or any other physical shape from an image region.

Furthermore, according to another conventional method, the quantity of features, such as a skin color or an eye shape, can be detected from an image and can be analyzed using a statistical method (For example, refer to Japanese Patent Application Laid-open No. 10-232934 or Japanese Patent Application Laid-open No. 2000-48184).

In the present exemplary embodiment, the face detection processing is performed using a method for detecting a pair of eyes (both eyes), a nose, and a mouth and determining a human face region based on a detected relative position. In this case, if a person (i.e., an object to be detected) closes one eye or suddenly turns his/her face to look away, identifying a face region may be difficult because a pair of eye (i.e., a reference portion) cannot be detected.

In many instances, the face detection processing requires a significant calculation time. As a result, the digital signal processing circuit 1007 cannot apply the face detection processing to the entire image data obtained for the through display. Thus, in the present exemplary embodiment, the digital signal processing circuit 1007 performs the face detection processing for every two acquisitions of through display image data.

In step S113, the system control circuit 1012 causes the digital signal processing circuit 1007 to perform frame display processing for displaying a frame showing a face detection result obtained in step S112.

Figure 3:
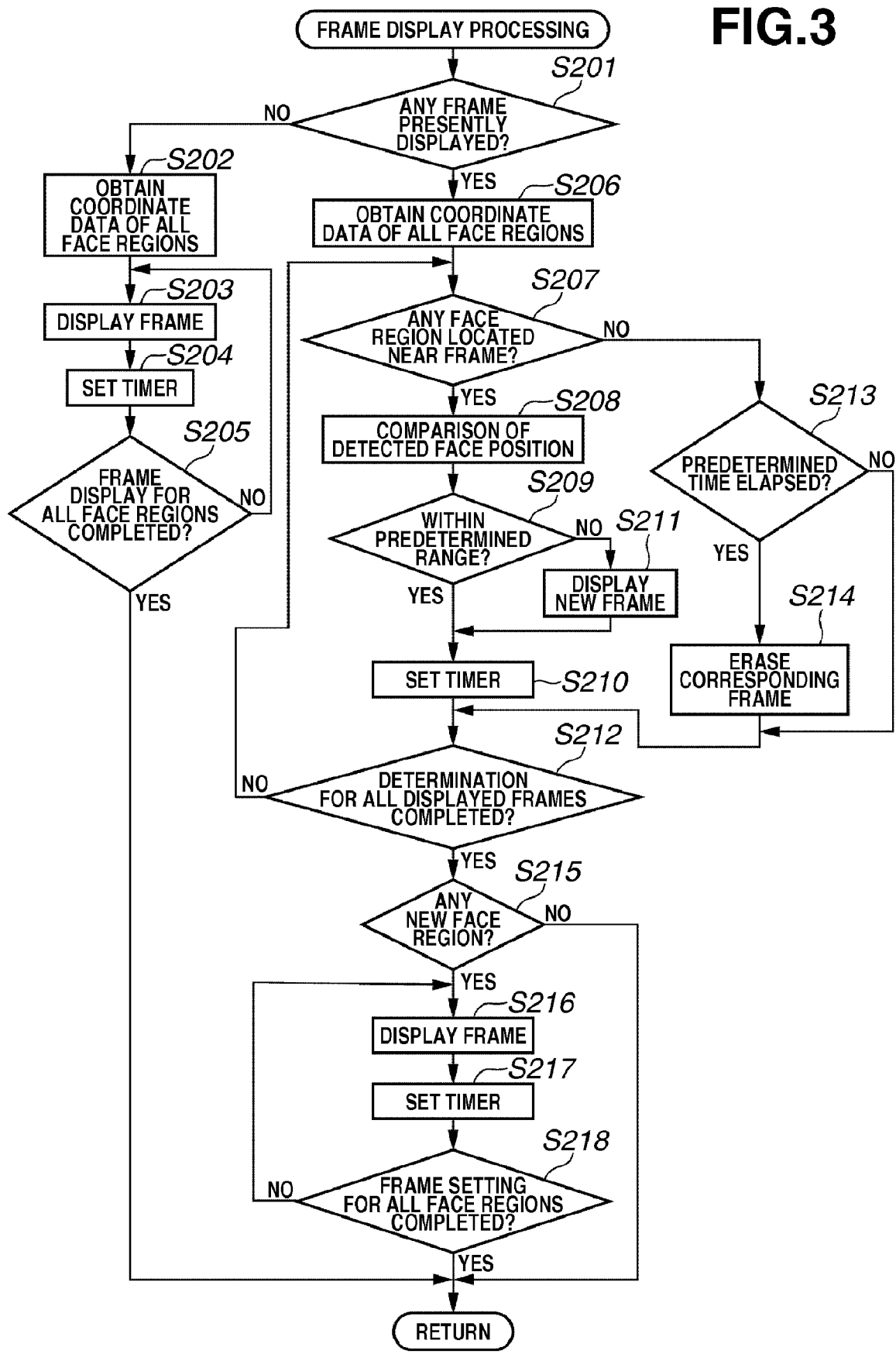
FIG. 3 is a flowchart showing an exemplary frame display processing routine in accordance with the first embodiment of the present invention.

FIG. 3 is a flowchart showing details of the frame display processing (refer to step S113). First, in step S201, the digital signal processing circuit 1007 determines whether a frame indicating the position of a detected face region (hereinafter, referred to as "face detection frame") is already displayed on the display unit 1010. When the face detection frame is not displayed yet, the processing flow proceeds to step S202. For example, if the processing of step S113 is first executed after a user sets a shooting mode to the imaging apparatus 1000, no face detection frame is displayed on the display unit 1010. Accordingly, the processing flow proceeds to step S202.

Figure 7A:
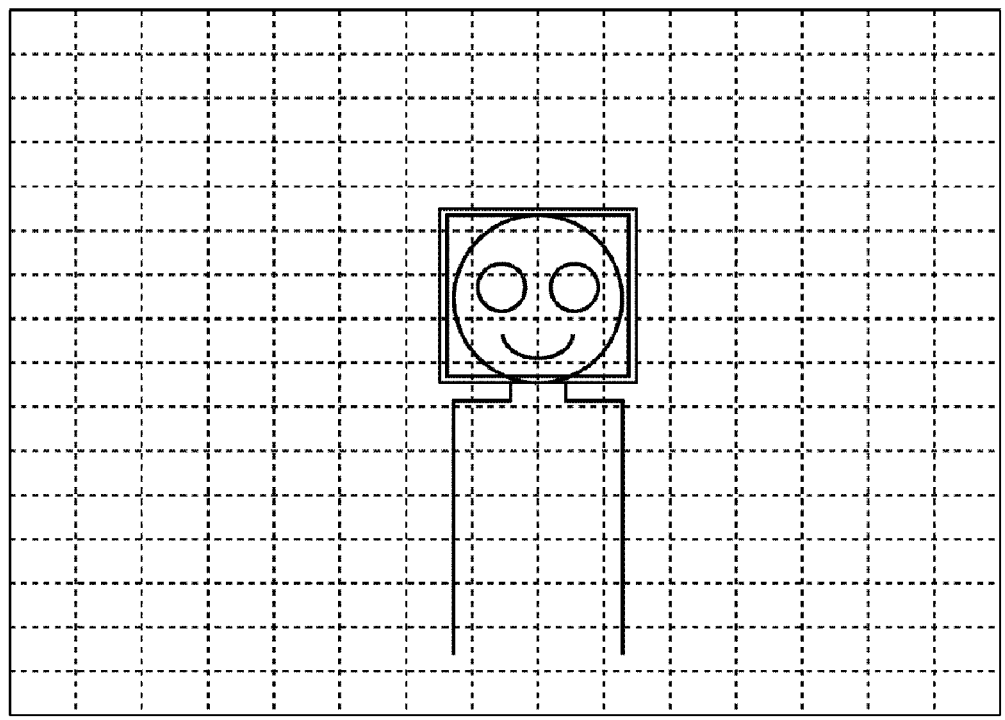
FIG. 7A is a view illustrating an exemplary display pattern of a face detection frame in accordance with an aspect of the present invention.

In step S202, the digital signal processing circuit 107 obtains coordinate data of all face regions detected in the face detection processing of step S112. In step S203, the display unit 1010 combines, based on the coordinate data of each face region obtained in step S202, the display of a face detection frame surrounding a detected face region with the display of a subject image, as shown in FIG. 7A. FIG. 7A is a display screen of the display unit 1010, including a rectangular face detection frame surrounding a detected human head.

In step S204, the timer 1015 starts measuring a display time of the face detection frame displayed in step S203. In step S205, the digital signal processing circuit 1007 determines whether the display of a face detection frame for all coordinate data representing the face regions obtained in step S202 is accomplished. When the display of a face detection frame for all coordinate data has been accomplished, the digital signal processing circuit 1007 terminates this routine.

When the display of face detection frames for all coordinate data is not accomplished yet, the processing flow returns to step S203. For example, if no face region is detected in step S112, the processing of steps S203 through S205 relating to the display of a face detection frame will not be performed.

Then, returning to step S114 of FIG. 2 after terminating the routine of FIG. 3, the system control circuit 1012 determines whether a shutter switch SW1 is in a pressed state. When the shutter switch SW1 is not in a pressed state, the processing flow returns to step S113. More specifically, unless the shutter switch SW1 is pressed, the through display in step S111, the face detection processing in step S112, and the frame display processing in step S113 are repetitively performed.

Therefore, if a person moves during the through display, the position of a detected face region will change and the face detection frame shifts correspondingly. In the present exemplary embodiment, the shape of the face detection frame can be an ellipse, or any other shape that fits the contour of a subject face. Furthermore, instead of displaying a face detection frame, it is possible to use a method for emphasizing the contour of a face region, or a method for shading the region other than a face region, as far as a detected face region can be recognized.

Returning to step S201, when a face detection frame is already displayed, the processing flow proceeds to step S206. The digital signal processing circuit 1007 obtains coordinate data of all face regions detected in the face detection processing of step S112.

In step S207, the digital signal processing circuit 1007 selects one of face detection frames already displayed. Then, the digital signal processing circuit 1007 determines whether a selected face detection frame is present in the vicinity of any coordinate position of a face region newly obtained in step S206. When the selected face detection frame is present in the vicinity of any coordinate position of a newly obtained face region (YES in step S207), the processing flow proceeds to step S208.

A neighboring region used in the decision can be experimentally obtained in such a manner that a person surrounded by a selected face detection frame agrees with a person represented by the coordinates of a newly obtained face region.

Furthermore, when plural face regions are present in the neighboring region, the digital signal processing circuit 1007 can select the coordinate data of a face region closest to the coordinate position of a face region being set in the selected face detection frame, and then execute the processing of step S208. In this case, if the digital signal processing circuit 1007 has an individual authentication function, the digital signal processing circuit 1007 can determine in step S207 whether a person surrounded by an already displayed face detection frame is the same.

In step S208, the digital signal processing circuit 1007 compares the coordinates of a selected face detection frame and the coordinates of a face region positioned in the vicinity of the face detection frame and obtains the difference.

In step S209, the digital signal processing circuit 1007 determines whether the difference obtained in step S208 is within a predetermined range. When the difference is within the predetermined range, the display unit 1010 does not update the position of the face detection frame and continues the display of the already displayed face detection frame. Then, the processing flow proceeds to step S210.

On the other hand, when the difference obtained in step S208 is not within the predetermined range, the processing flow proceeds to step S211. In step S211, the display unit 1010 sets a new face detection frame based on the coordinate data of the face region compared in step S208, and displays the new face detection frame. Then, the processing flow proceeds to step S210.

In step S209, by determining whether the difference obtained in step S208 is within the predetermined range, it can be determined if the coordinates of a newly obtained face region are positioned in the already displayed face detection frame.

However, if the face detection frame makes frequent shift movements, the visibility of the screen will deteriorate. Hence, when the coordinate position of a newly obtained face region remains in the already displayed face detection frame, it is desirable to postpone updating the face detection frame to improve the visibility of the screen.

In step S210, the timer 1015 starts measuring a display time corresponding to the face detection frame selected as an object in the decision made in step S207, or a display time corresponding to the face detection frame updated in step S211 after returning its value to an initial value. Then, the processing flow proceeds to step S212.

In step S207, when the coordinate position of the newly obtain face region is not in the vicinity of the selected face detection frame, the processing flow proceeds to step S213. In step S213, the digital signal processing circuit 1007 determines whether the display time of the selected face detection frame measured by the timer 1015 has reached a predetermined time. When the measurement time has already reached the predetermined time (YES in step S213), the processing flow proceeds to step S214.

In the S214, the digital signal processing circuit 1007 erases the face detection frame and resets the measurement time to an initial value. Otherwise, when the measurement time does not yet reach the predetermined time (NO in step S214), the digital signal processing circuit 1007 continues displaying the face detection frame without resetting the timer 1015. Then, the processing flow proceeds to step S212.

In step S212, the digital signal processing circuit 1007 determines whether the processing of step S207 is finished for all of the already displayed face detection frames. When there is any face detection frame being not yet processed, the processing flow returns to step S207. Otherwise, the processing flow proceeds to step S215.

In step S215, the digital signal processing circuit 1007 determines whether there is any face region whose coordinate position is not close to all of the face detection frames used in step S207. When such a face region is not present, the digital signal processing circuit 1007 terminates this routine. When at least one face region has a coordinate position not close to any of the face detection frames, the processing flow proceeds to step S216 to set a new face detection frame.

In step S216, the display unit 1010 combines, based on the coordinate data of each face region obtained in step S206, the display of a face detection frame surrounding a detected face region with the display of a subject image. In step S217, the timer 1015 starts measuring a display time of a face detection frame newly displayed in step S216.

In step S218, the digital signal processing circuit 1007 determines whether there is a face region to which a face detection frame is not yet set. When the setting of a face detection frame for all coordinate data has been accomplished (YES in step S218), the digital signal processing circuit 1007 terminates this routine. When there is a face region to which a face detection frame is not yet set (NO in step S218), the processing flow returns to step S216.

Now returning back to FIG. 2, after step S113 is completed, the process proceeds to step S114 where the system control circuit 1012 determines whether the shutter switch SW1 is in a pressed state. When the shutter switch SW1 is not in a pressed state, the processing flow returns to step S113. When the shutter switch SW1 is in a pressed state, the processing flow proceeds to step S115. Here, it is noted that when the shutter switch SW1 is pressed, the digital signal processing circuit 1007 suspends the face detection processing until the shutter switch SW1 is released.

In step S115, the system control circuit 1012 performs AF processing to adjust a focal distance of the imaging lens group 1001 to the subject, and further performs AE processing to determine a diaphragm value and a shutter speed. The AE processing can include the settings for a flashlight if necessary.

Figure 4:
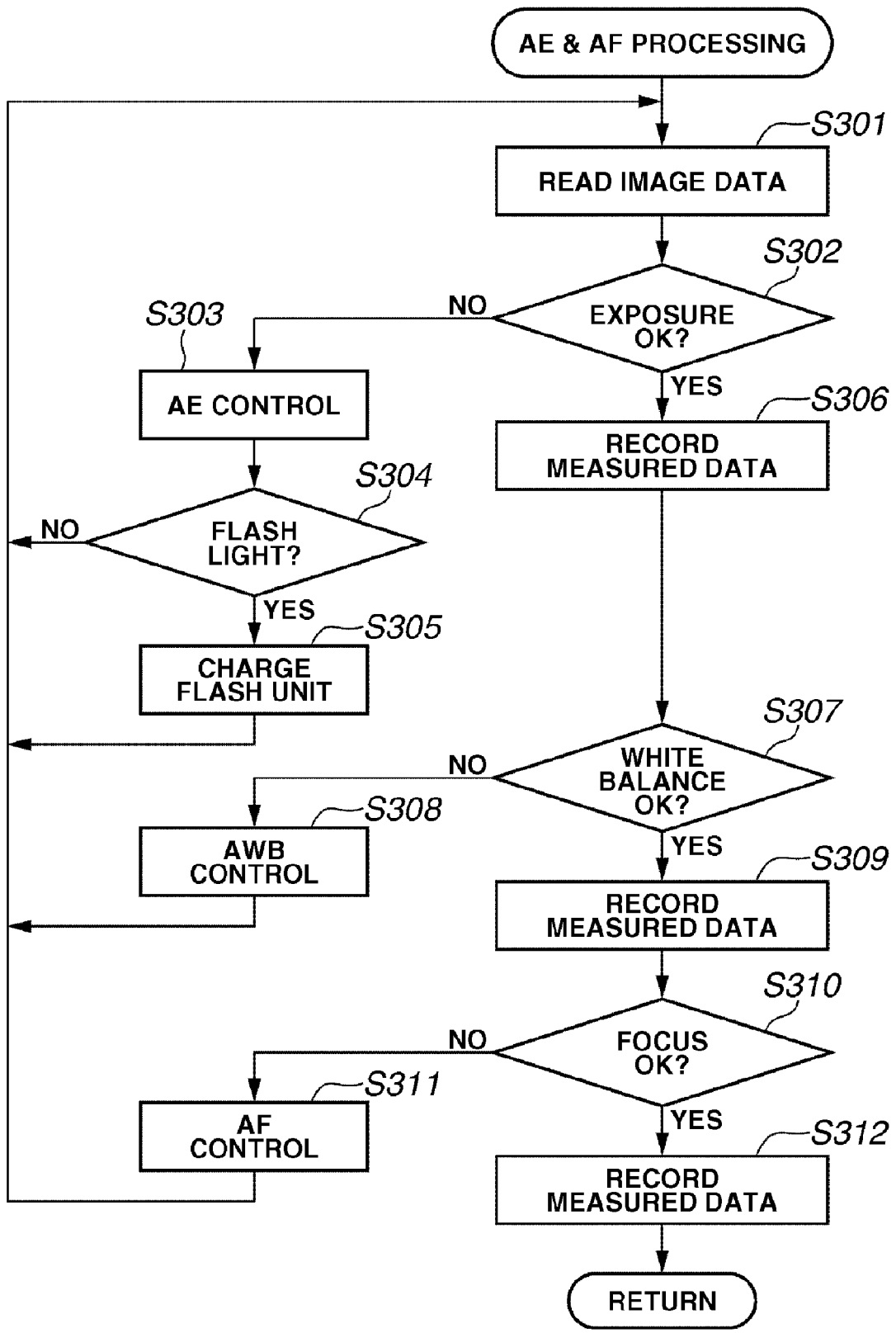
FIG. 4 is a flowchart showing an exemplary AE and AF processing routine in accordance with the first embodiment of the present invention.

FIG. 4 is a flowchart showing details of exemplary AF and AE processing performed in step S115. First, in step S301, an electric charge signal is produced from the imaging element 1003. The A/D converter 1005 converts the electric charge signal into digital data. The digital signal processing circuit 1007 inputs the digital data.

The digital signal processing circuit 1007 performs, based on the input image data, predetermined calculations for the TTL-type AE processing, EF processing, AWB processing, and AF processing. In each processing, the digital signal processing circuit 1007 uses only the image data of the face regions detected by step S112 without using all of captured pixels, or increases a weighting factor given to the detected face regions compared to those given to other regions. Thus, in each of the TTL-type AE processing, EF processing, AWB processing, and AF processing, the digital signal processing circuit 1007 can give priority to the calculations of image data of the detected face regions.

However, when the processing flow proceeds from step S209 to step S210, the coordinate position of the detected face region does not completely agree with the position of the displayed face detection frame. In this case, in each of the AE processing, EF processing, AWB processing, and AF processing, the digital signal processing circuit 1007 uses the coordinates of a latest detected face region instead of using the position where the face detection frame is displayed.

In step S302, based on the results obtained by predetermined calculations in step S301, the system control circuit 1012 determines whether the exposure is appropriate. When the exposure is inappropriate (NO in step S302), the processing flow proceeds to step S303. In step S303, the system control circuit 1012 causes the exposure control circuit 1013 to perform an AE control.

Then, in step S304, the system control circuit 1012 determines, based on the measurement data obtained in the AE control, whether flashlight is required. When flashlight is necessary, the processing flow proceeds to step S305. In step S305, a flashlight flag is set and a flashlight (not shown in the drawings) is charged. Then, the processing flow returns to step S301. On the other hand, when no flashlight is required, the process returns to step S301.

When the exposure is appropriate in step S302 (YES in step S306), the processing flow proceeds to step S306. In step S306, the system control circuit 1012 causes its memory or the memory 1008 to store measurement data or setting parameters. Then, in step S307, the system control circuit 1012 determines whether the white balance is appropriate, based on calculation results obtained by the digital signal processing circuit 1007 and measurement data obtained in the AE control.

When the white balance is inappropriate (NO in step S307), the processing flow proceeds to step S308. In step S308, the system control circuit 1012 causes the digital signal processing circuit 1007 to adjust color processing parameters and perform an AWB control. Then, the processing flow returns to step S301. On the other hand, when the system control circuit 1012 determines that the white balance is appropriate in step S307 (YES in step S307), the processing flow proceeds to step S309.

In step S309, the system control circuit 1012 causes its memory to store measurement data or setting parameters of the memory 1008. Then, in step S310, the system control circuit 1012 determines whether the camera is in a focused state. When the camera is not in a focused state, the processing flow proceeds to step S311. Instep S311, the system control circuit 1012 causes the focus control circuit 1014 to perform an AF control. Then, the processing flow returns to step S301. When the system control circuit 1012 decides that the camera is in a focused state in step S310, the processing flow proceeds to step S312.

In step S312, the system control circuit 1012 causes its memory to store measurement data or setting parameters, sets a display of an AF frame indicating a focused region, and terminates the AF processing and the AE processing. The AF frame has a position identical to the coordinate position of the latest face region.

Now returning to FIG. 2, in step S116, the system control circuit 1012 sets the display unit 1010 into the through display state again after finishing the AF processing and the AE processing, to display the AF frame.

Next, in step S117, the system control circuit 1012 determines whether a shutter switch SW2 is in a pressed state. If it is determined that switch SW2 is in a switched state, the process proceeds to step S119. If it is determined that switch SW2 is not in a switched state, the process proceeds to step S118. In step S118, the system control circuit 1012 determines whether the shutter switch SW1 is in a pressed state. If it is determined that switch SW1 is in a switched state, the process returns to step S117. If it is determined that switch SW2 is not in a switched state, the process returns to step S112. Thus, when both the shutter switches SW1 and SW2 are not in a pressed state, the processing flow returns to step S112.

In step S119, the system control circuit 1012 executes exposure processing for writing captured image data into the memory 1008. Furthermore, the system control circuit 1012 with the memory control circuit 1006 (and the digital signal processing circuit 1007 if necessary) executes shooting processing including developing processing for reading image data from the memory 1008 and performing various processing.

Figure 5:
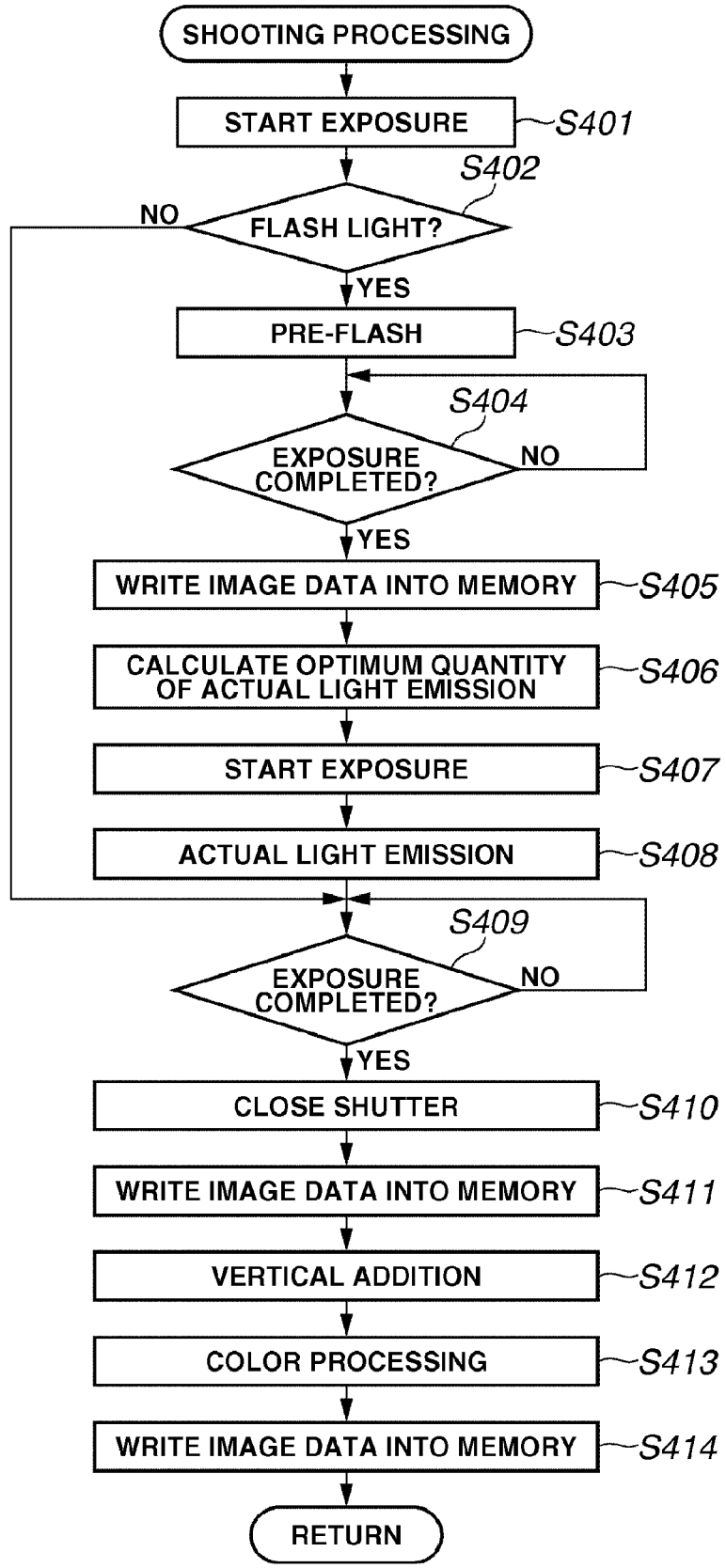
FIG. 5 is a flowchart showing an exemplary imaging processing routine in accordance with the first embodiment of the present invention.

FIG. 5 is a flowchart showing exemplary details of the shooting processing (refer to step S119). In step S401, according to the measurement data obtained in the above-described AE control, the exposure control circuit 1013 sets a diaphragm value of the light quantity adjuster 1002 and starts exposure of the imaging element 1003.

In step S402, the system control circuit 1012 determines, based on a flashlight flag, whether flashlight is necessary. When flashlight is necessary, the processing flow proceeds to step S403 to cause a flash unit to emit a predetermined quantity of light for a pre-flash. It is noted that the light quality of a pre-flash can be determined based on the diaphragm value of the light quantity adjuster 1002, distance to a subject, and sensitivity being set for the imaging element 1003. When the system control circuit 1012 decides that no flashlight is necessary in step S402, the flash unit does not perform a pre-flash and the processing flow proceeds to step S409.

In step S404, the exposure control circuit 1013 waits for an exposure termination timing for imaging element 1003 based on photometric data. When the exposure termination timing is completed, the processing flow proceeds to step S405.

In step S405, the system control circuit 1012 causes the imaging element 1003 to produce an electric charge signal. Then, the system control circuit 1012 causes the A/D converter 1005, the digital signal processing circuit 1007, and the memory control circuit 1006 (or the A/D converter 1005 and directly the memory control circuit 1006) to write captured image data into the memory 1008.

Next, the processing flow proceeds to step S406. In step S406, the system control circuit 1012 obtains an average brightness value in the face region during the moment of a pre-flash, and calculates an optimum quantity of light emission (i.e., the quantity of light emission during an actual shot) so that the face region can have an appropriate brightness. For example, when an image signal level obtained during a pre-shot action accompanied with a pre-flash is appropriate, the quantity of light emission for an actual shot can be the same as that for the pre-shot action. Furthermore, if the image signal level during the pre-shot action is one-stage lower than a target level, the quantity of light emission can be doubled for an actual shot.

Next, in step S407, the system control circuit 1012 causes the imaging element 1003 to perform a reset action for an actual shot and start exposure. Then, the processing flow proceeds to step S408. In step S408, the flash unit emits light with the optimum quantity obtained in step S406.

In step S409, the exposure control circuit 1013 waits for an exposure termination timing for imaging element 1003 based on photometric data. When the exposure termination timing is completed, the exposure control circuit 1013 stops exposure and closes the shutter in step S410.

Next, in step S411, the system control circuit 1012 causes the imaging element 1003 to output an electric charge signal. Then, the system control circuit 1012 causes the A/D converter 1005, the digital signal processing circuit 1007, and the memory control circuit 1006 (or the A/D converter 1005 and directly the memory control circuit 1006) to write captured image data into the memory 1008.

In step S412, the system control circuit 1012 causes the memory control circuit 1006 (and the digital signal processing circuit 1007 if necessary) to read the image data from the memory 1008 and execute vertical addition processing. In step S413, the system control circuit 1012 causes the digital signal processing circuit 1007 to perform color processing. In step S414, the system control circuit 1012 causes the memory 1008 to store the processed display image data, and terminates the shooting processing routine.

Now, once again referring back to FIG. 2, after the shooting processing of step S119 is finished, the processing flow proceeds to step S120. In step S120, the system control circuit 1012 causes the display unit 1010 to execute a quick review display based on the image data obtained in step S119. It is noted that the display unit 1010 during a shooting action can always be in a displayed state as an electronic viewfinder. Further, it noted that the quick review display can be performed immediately after accomplishing a shooting action.

In step S121, the system control circuit 1012 causes the memory control circuit 1006 (and the digital signal processing circuit 1007 if necessary) to read the captured image data from the memory 1008 and execute various image processing. Furthermore, the system control circuit 1012 executes recording processing for compressing image data and writing compressed image data into a storage medium.

After the recording processing of step S121 is finished, the system control circuit 1012 determines in step S122 whether the shutter switch SW2 is in a pressed state. If in step S122 the switch SW2 is in a pressed state (YES in step S122), the process proceeds to step S123. If in step S122 the switch SW2 is not in a pressed state (NO in step S122), the process proceeds to step S124.

In step S123, the system control circuit 1012 determines whether a continuous shooting flag is in an ON state. If in step S123 the continuous shooting flag is in an ON state (YES in step S123), the process flow returns to step S119. Here, it is noted that the continuous shooting flag can be stored in the internal memory of the system control circuit 1012 or in the memory 1008. Then, in step S119, the system control circuit 1012 causes the imaging apparatus 1000 to shoot the next image to realize a continuous shooting. Or, on the other hand, if in step S122 the continuous shooting flag is not in an ON state (NO in step S123), the process returns to step S122. The system control circuit 1012 repeats the processing of steps S122 and S123 until the shutter switch SW2 is released.

As described above, according to the present exemplary embodiment, it is determined, in an operation setting mode for executing the quick review display immediately after accomplishing a shooting action, whether the shutter switch SW2 is in a pressed state at the termination timing of the recording processing (refer to step S121). When the shutter switch SW2 is in a pressed state, the display unit 1010 continues the quick review display until the shutter switch SW2 is released. This procedure enables a user to carefully confirm shot images (i.e., captured images).

If the shutter switch SW2 is turned off immediately after the recording processing of step S121, the processing flow proceeds to step S124 from step S122. A user may continuously press the shutter switch SW2 to confirm shot images provided by the quick review display for a while after the recording processing of step S121 and then turn the shutter switch SW2 off. In such a case, the processing flow proceeds to step S124 from step S122, in a similarly manner.

In step S124, the system control circuit 1012 determines whether a predetermined minimum review time has elapsed. If in step S124 the minimum review time has already elapsed (YES in step S124), the processing flow proceeds to step S125. In step S125, the system control circuit 1012 brings the display state of the display unit 1010 into a through display state. With this processing, a user can confirm shot images on the display unit 1010 that provides a quick review display. Then, the display unit 1010 starts a through display state to successively display shot image data for the next shoot.

Next, the processing flow proceeds to step S126. In step S126, the system control circuit 1012 determines whether the shutter switch SW1 is in an ON state. When the shutter switch SW1 is in an ON state, the processing flow proceeds to step S117 for the next shooting action. On the other hand, when the shutter switch SW1 is in an OFF state, the imaging apparatus 1000 performs a series of shooting operations. Then, the processing flow returns to step S112.

The above-described face detection frame displaying method according to the exemplary embodiment has the following characteristics. When a face detection frame is displayed (refer to steps S203, S211, and S216), the timer 1015 starts measuring a display time of the face detection frame (refer to steps S204, S210, and S217). If the timer 1015 counts up a predetermined time, i.e., if it continuously fails to detect a mankind having a human face similar to that surrounded by the face detection frame, the face detection frame is erased (refer to step S214).

The predetermined time counted by the timer 1015 is set to be longer than the time required to perform the next face detection and display the face detection frame again based on the detection result after the face detection frame is displayed at least once. More specifically, as far as the face detection is continuously successful, the face detection frame cannot be erased by the timer that counts the predetermined time.

Figure 6A:
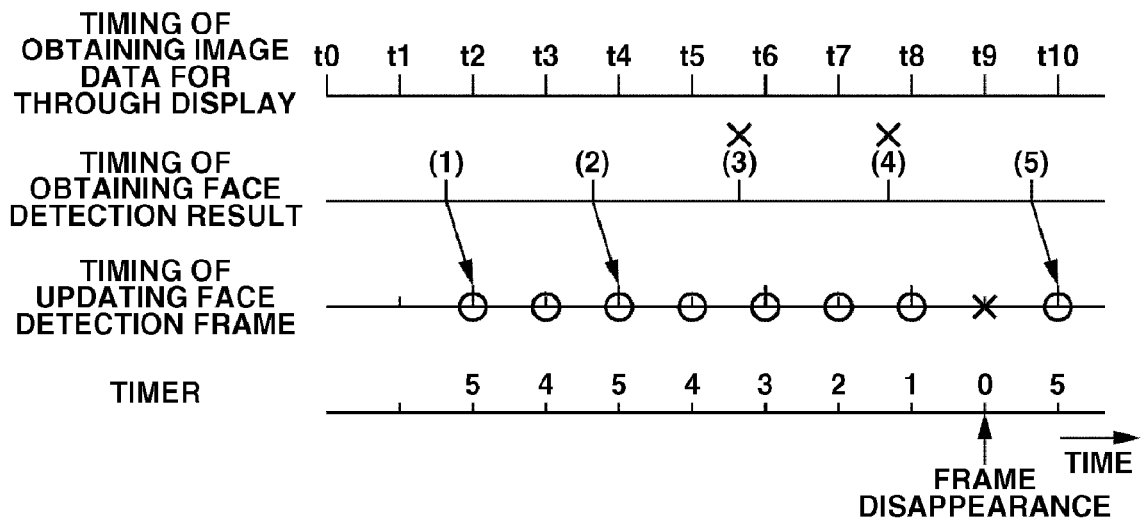
FIG. 6A is a view showing an exemplary relationship between the measurement time of a timer and display/erasure of a face detection frame in accordance with the first embodiment of the present invention.

FIG. 6A is a view exemplarily showing a relationship between the measurement time of the timer 1015 and display/erasure of a face detection frame. FIG. 6A shows, from the above, the timing of obtaining image data for a through display, the timing of obtaining a face detection result, the timing of updating the face detection frame, and a measured time of the timer 1015. Each abscissa represents the time.

The through display image data can be updated at the intervals of 1/30 second, as indicated by timings t0, t1, t2, t3, t4, t5, t6, t7, t8, t9, and t10. A face detection result corresponding to the image data obtained at the timing t0 can be obtained at the timing (1). A face detection result corresponding to the image data obtained at the timing t2 can be obtained at the timing (2). A face detection result corresponding to the image data obtained at the timing t4 can be obtained at the timing (3).

According to the example shown in FIG. 6A, the face detections at the timings (3) and (4) have ended in failure. The face detection results obtained in the timings (1) and (2) involve coordinate data of a detected face region. The face detection frame can be updated at the intervals of 1/30 second, i.e., at the same intervals as those of the through display.

The timer 1015 counts down by one each time the update timing of the face detection frame comes. According to the example shown in FIG. 6A, coordinate data of a detected face region can be obtained at the timing (1). The face detection frame can be newly displayed at the next update timing of the face detection frame. The timer 1015 sets the count value to '5.' At the next update timing of the face detection frame, the count value decreases by 1 and becomes '4.'

At the succeeding update timing of the face detection frame, coordinate data of a face region newly obtained at the timing (2) are present. Accordingly, the face detection frame can be updated based on the coordinate data of a newly obtained face region. The timer 1015 again resets the count value to '5.'

However, the face detection result obtained at the timing (3) does not involve any coordinate data of a face region. Therefore, the timer 1015 decreases its count value to '2.' In this case, because the count value does not reach '0' yet, the face detection frame can be continuously displayed regardless of failure in the face detection.

Furthermore, the face detection result obtained at the next timing (4) does not involve any coordinate data of a face region, and the count value decreases to '0.' In this case, because the measurement time of the timer 1015 has reached the predetermined time, the face detection frame is erased.

Subsequently, the face detection result obtained at the timing (5) involves coordinate data of a newly detected face region. Accordingly, the face detection frame is displayed again, and the timer 1015 sets its count value to '5.'

As described above, the present exemplary embodiment provides a function of continuously displaying the face detection frame for a predetermined time until the count value of the timer 1015 reaches '0', even if the face detection is failed in this period. Furthermore, when no face detection frame is displayed on the display unit 1010, the detection result of a newly obtained face can be directly used to display a face detection frame (refer to step S203, FIG. 2).

When a face detection frame is already displayed on the display unit 1010, and when a new face detection result is obtained in the vicinity of the face detection frame, different methods can be selected considering the position of the already displayed face detection frame and a face position obtained from a new face detection result.

When the position of the already displayed face detection frame is close to the face position obtained from a new face detection result, frequently shifting the face detection frame is undesirable in view of the visibility and it is desirable to intentionally fix the position of the face detection frame.

On the contrary, when the position of the already displayed face detection frame is not close to the face position obtained from a new face detection result, the position of the face detection frame should be updated to track a face position of the subject (refer to step S211, FIG. 3).

As described above, the first exemplary embodiment enables a continuous display of a face detection frame for a predetermined time regardless of failure in the face detection. Accordingly, when a subject person blinks and closes an eye or suddenly turns his/her face to look away, the present exemplary embodiment can prevent the face detection frame from being erased inadvertently. As a result, the first exemplary embodiment can suppress an undesirable phenomenon repeating the display and erasure of the face detection frame in a short period of time.

Second Exemplary Embodiment

Another exemplary embodiment of the present invention will be described below. The second exemplary embodiment is characterized in that the timer 1015 can change a count value according to the position or size of a detected face region.

When a detected face region is positioned at the center of a screen, failure in detecting a face region may occur due to a person who turns his/her face to look away or closes an eye. In this case, the human face probably remains at the same position regardless of failure in the detection of a face region. Thus, the timer 1015 sets a longer count time.

On the other hand, when a detected face region is positioned at the edge of a screen, failure in detecting a face region probably occurs because a person has disappeared from the screen. In this case, failing in detecting a face region means that the human face is no longer present on the screen. Thus, the timer 1015 sets a shorter count time. Furthermore, if a detected face region has a small area, a subject person will be positioned far from the camera. Even when the person moves, the positional change of the person on the screen will remains small.

On the contrary, if a detected face region has a large area, a subject person will be positioned near the camera. If the person moves slightly, the person may soon disappear from the screen. Hence, the timer 1015 sets a longer count time when the detected face region has a smaller area, and sets a shorter count time when the detected face region has a larger area.

Figure 8A:
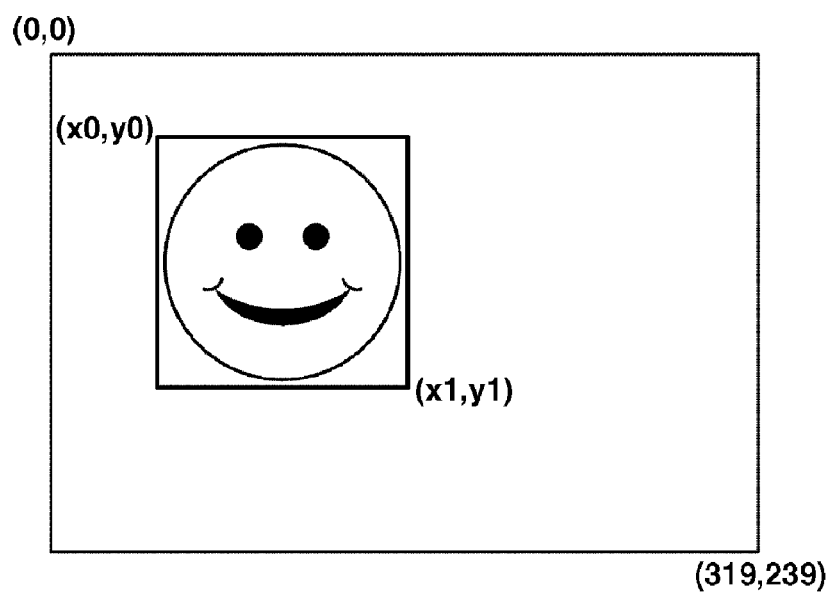
FIG. 8A is a view showing an exemplary relationship between the position and size of a detected face region in comparison with through display image data used in face detection processing in accordance with the second embodiment of the present invention.
Figure 8B:
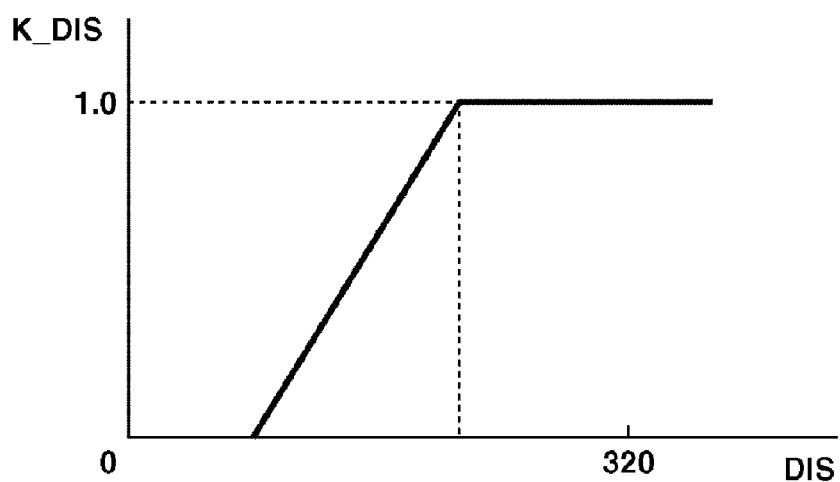
FIG. 8B is a graph showing an exemplary relationship between the position of a detected face region and a timer correction coefficient in accordance with the second embodiment of the present invention.
Figure 8C:
FIG. 8C is a graph showing an exemplary relationship between the size of a detected face region and a timer correction coefficient in accordance with the second embodiment of the present invention.

FIG. 8A is a view showing an exemplary relationship between the position and size of a detected face region in comparison with through display image data used in the face detection processing. FIG. 8B is a graph showing an exemplary relationship between the position of a detected face region and a correction coefficient applied to the count value of the timer 1015. FIG. 8C is a graph showing an exemplary relationship between the size of a detected face region and a correction coefficient applied to the count value of the timer 1015.

Now referring to FIG. 8A, it is noted that FIG. 8A shows QVGA image data consisting of 320×240 pixels, with an upper left corner positioned at the coordinates (0,0) and a lower right corner positioned at the coordinates (319,239). Here, it may be assumed that coordinates (x0, y0) represent an upper left corner, coordinates (x0, y1) represent a lower left corner, coordinates (x1, y0) represent an upper right corner, and coordinates (x1, y1) represent a lower right corner of a face region obtained in the face detection processing.

It is possible to calculate, based on these coordinate data, a shortest distance DIS representing a distance between the face detection frame and the edge of a screen according to the following formula.

DIS=min(x0, y0, 320−x1, 240−y1)

Then, it is possible to obtain a timer correction coefficient K_DIS with reference to the obtained DIS.

The timer correction coefficient K_DIS can take a value between 0.0 and 1.0, as understood from the relationship of DIS and K_DIS shown in FIG. 8B. When the distance DIS is small, i.e., when a detected face is positioned near the edge of a screen, the timer correction coefficient K_DIS takes a smaller value.

Although the present exemplary embodiment obtains the distance between the face detection frame and the edge of a screen, it is possible to obtain a distance between a central region of the face detection frame and the edge of a screen.

Furthermore, it is possible to calculate, based on the above-described coordinate data, an AREA representing the size of a face detection frame according to the following formula.

AREA=(x1−x0)×(y1−y0)

Then, it is possible to obtain a timer correction coefficient K_AREA with reference to the obtained AREA.

The timer correction coefficient K_AREA can take a value between 0.0 and 1.0, as understood from the relationship of AREA and K_AREA shown in FIG. 8C. When the AREA is large, i.e., when a detected face has a larger area, the timer correction coefficient K_AREA takes a smaller value.

The timer correction coefficients K_DIS and K_AREA can be multiplied with a timer reference value Tref (Tref=7 according to an exemplary embodiment) to obtain an initial count value T for the timer 1015. In this case, the initial count value T is an integer obtainable by removing fractions from the result of the multiplication between the coefficients K_DIS and K_AREA and the reference value Tref. It is however possible to use, in the calculation, only one of the timer correction coefficients K_DIS and K_AREA.

Figure 6B:
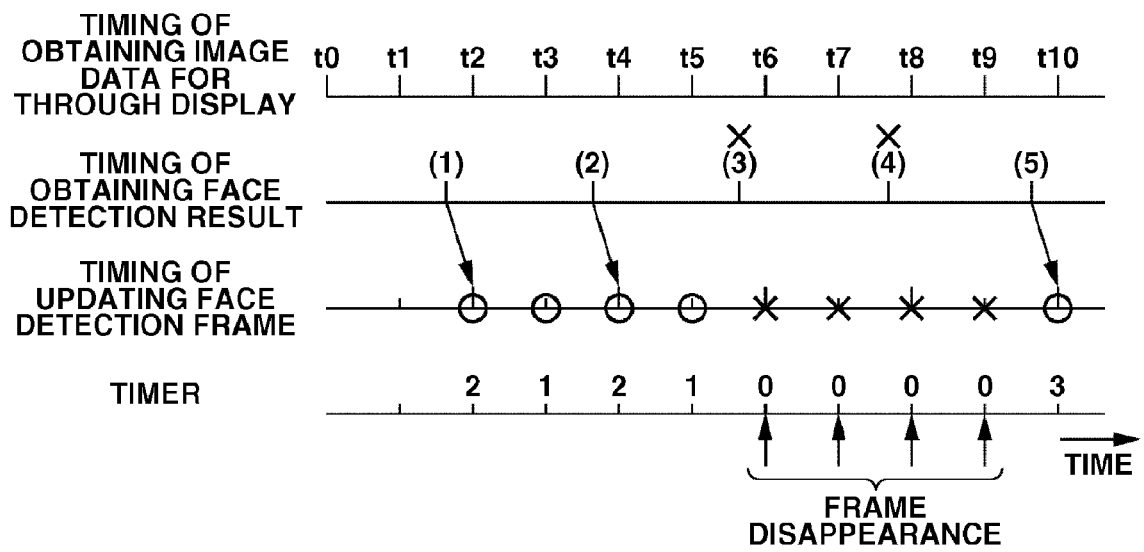
FIG. 6B is a view showing an exemplary relationship between the measurement time of a timer and display/erasure of a face detection frame in accordance with a second exemplary embodiment of the present invention.
Figure 6C:
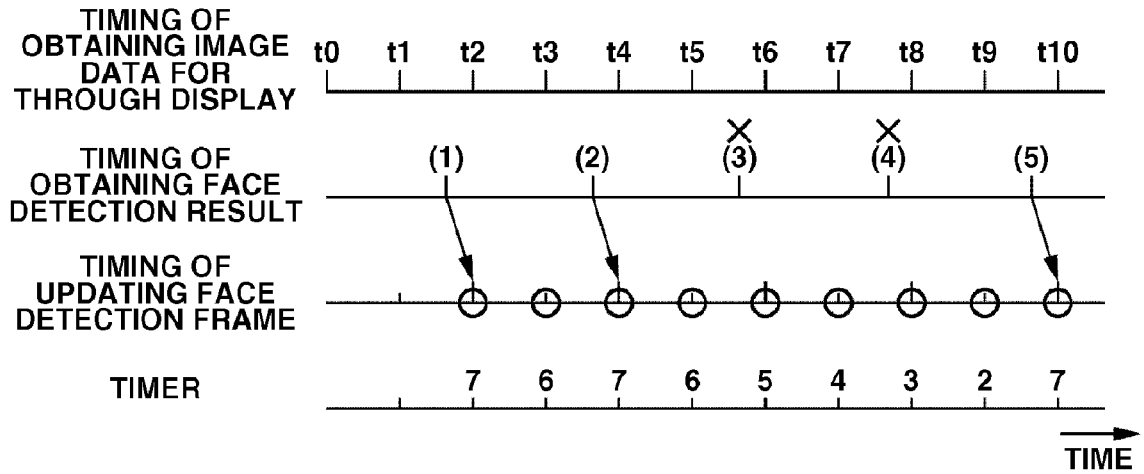
FIG. 6C is a view showing another exemplary relationship between the measurement time of a timer and display/erasure of a face detection frame in accordance with the second embodiment of the present invention.

Each of FIGS. 6B and 6C show a relationship between the measurement time of timer 1015 and display/erasure of a face detection frame, when the timer 1015 uses an initial count value different from that used in the first exemplary embodiment.

According to the example of FIG. 6B, coordinate data of a face region can be obtained at the timings (1) and (2). However, the initial count value of the timer is set to '2.' Therefore, failure in obtaining coordinate data of a face region at the timing (3) results in disappearance of the face detection frame at the next update timing of the face detection frame. It is further noted that a new face detection frame is not displayed until the timing (5) at which coordinate data of a new face region can be obtained. The new face detection frame can be displayed immediately after the timing (5). Further, according to the example shown in FIG. 6B, an initial count value newly set for the timer 1015 is '3', because a newly detected face region is positioned relatively far from the edge of a screen, or because a newly detected face region has a smaller area.

According to the example of FIG. 6C, the initial count value of the timer 1015 is set to '7.' Therefore, regardless of failure in obtaining coordinate data of a face region at the timings (3) and (4), the count value of the timer 1015 never reaches '0' before the timing (5) at which coordinate data of a new face region can be obtained. Accordingly, as shown in FIG. 6C, the face detection frame can be continuously displayed during the term of timings (1) through (5).

As described above, the second exemplary embodiment enables a continuous display of a face detection frame for a predetermined time regardless of failure in the face detection. Furthermore, the second exemplary embodiment enables to change the predetermined time in accordance with at least one of the position and size of a detected face.

Accordingly, in a situation that a subject probably remains on a screen, the present exemplary embodiment can prevent the face detection frame from being erased inadvertently. As a result, the second exemplary embodiment can suppress an undesirable phenomenon repeating the display and erasure of the face detection frame in a short period of time.

Third Exemplary Embodiment

Another exemplary embodiment of the present invention will be described below. Compared to the first exemplary embodiment, the third exemplary embodiment is differentiated in the succeeding processing of step S207 (from FIG. 3) shown in FIG. 3, performed when the selected face detection frame is not positioned near the coordinate position of a face region obtained in step S206.

More specifically, the third exemplary embodiment includes processing of steps S501 through S505 which is not described in the first exemplary embodiment and will be described below in detail. Steps denoted by the same reference numerals as those shown in FIG. 3 described in the first exemplary embodiment can perform the same processing.

Figure 9:
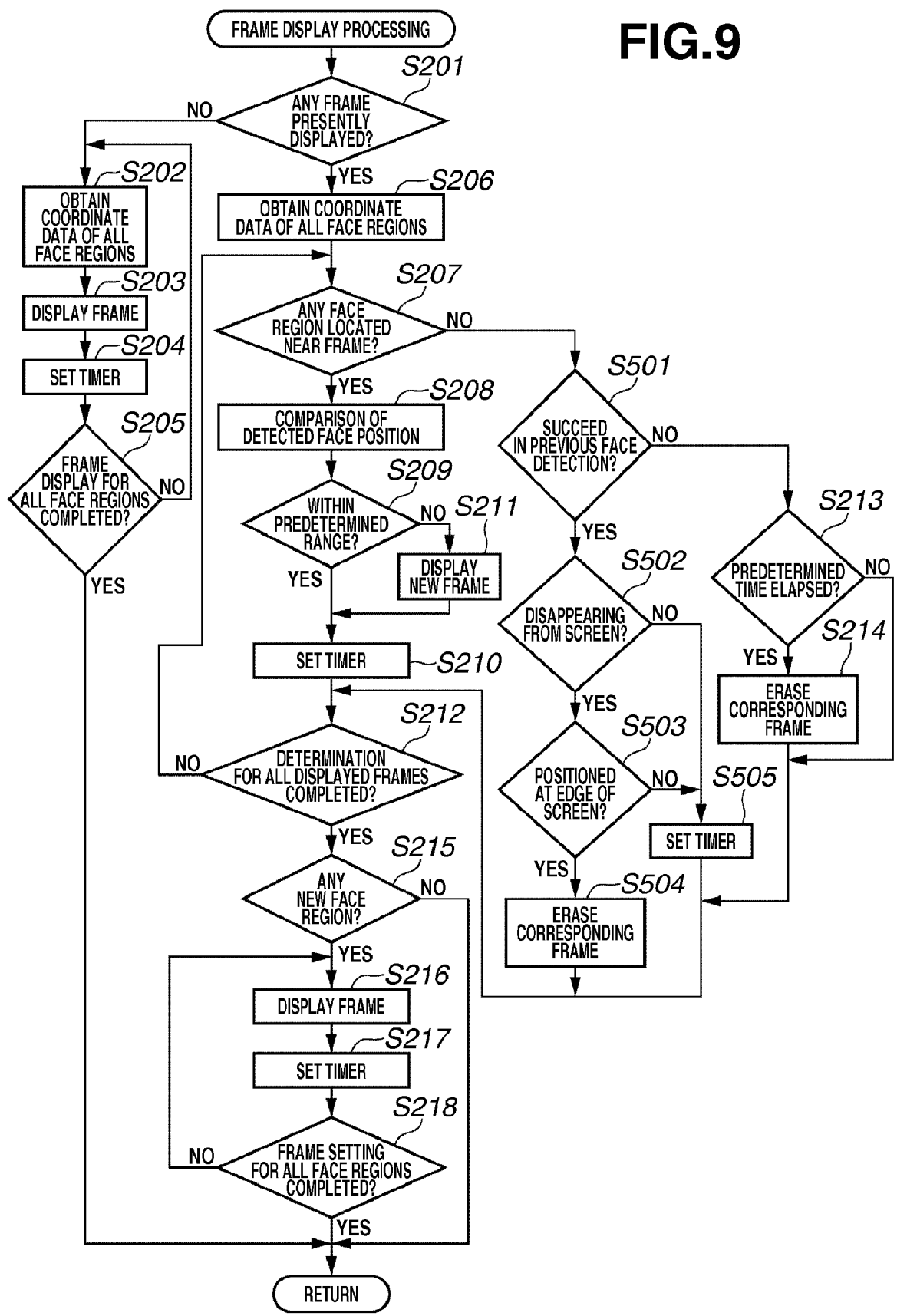
FIG. 9 is a flowchart showing an exemplary frame display processing routine in accordance with a third exemplary embodiment of the present invention.

In step S207 of FIG. 9, the digital signal processing circuit 1007 selects one of face detection frames already displayed. Then, the digital signal processing circuit 1007 determines whether a selected face detection frame is present in the vicinity of any coordinate position of a face region newly obtained in step S206. When the selected face detection frame is not present in the vicinity of any coordinate position of a newly obtained face region, the processing flow proceeds to step S501.

In step S501, the digital signal processing circuit 1007 determines whether, at a previous timing, any coordinate position of a face region is detected in the vicinity of the face detection frame selected in step S207. When no coordinate position of a face region is detected, the processing flow proceeds to step S213 to continuously display or erase the face detection frame with reference to the measurement time of the timer 1015. When any coordinate position of a face region is detected, the processing flow proceeds to step S502.

In step S502, the digital signal processing circuit 1007 calculates the movement of a face region based on the coordinate data of the face region positioned closest to the face detection frame selected in step S207. When the moving direction of a face region is directed to the outside of a screen, the processing flow proceeds to step S503. On the other hand, when the movement of the face region remains within an area of the screen, the face region does not disappear from the screen for a while. Thus, the processing flow proceeds to step S505. In step S505, the timer 1015 resets its count value to an initial value and starts measuring a display time and then the process flow proceeds to step S212.

In step S503, the digital signal processing circuit 1007 determines whether the coordinate position of the face region used in the calculation of the movement of the face region is positioned at the edge of the screen. When the face region is positioned at the edge of the screen, the face region may probably disappear from the screen. Therefore, in step S504, the face detection frame used in the calculation of the face region is erased. Next the process flow proceeds to step S212.

As described above, the third exemplary embodiment decides the erasure of a face detection frame based on the moving direction and position of a face region. Accordingly, in a situation that a subject will soon disappear from the screen, the face detection frame can be promptly erased.

Thus, the present exemplary embodiment can suppress such an undesirable phenomenon that the detection frame is continuously displayed even after a subject face has already disappeared from the screen.

Furthermore, in the above-described step S502, it is possible to obtain not only the moving direction but also the moving speed of a face region. When the moving speed is high, an initial value set for the timer 1015 in step S505 can be decreased. The faster the moving speed of a subject is, the higher the possibility of disappearing from the screen becomes.

Fourth Exemplary Embodiment

Furthermore, another exemplary embodiment of the present invention will be described below with reference to FIG. 10. Compared to the first exemplary embodiment, the fourth exemplary embodiment is differentiated in the succeeding processing of step S207 shown in FIG. 3, performed when the selected face detection frame is not positioned near the coordinate position of a face region obtained in step S206.

More specifically, the fourth exemplary embodiment includes processing of steps S601 through S603 which is not described in the first exemplary embodiment and will be described below in detail. Steps denoted in FIG. 10 by the same reference numerals as those shown in FIG. 3 described in the first exemplary embodiment can perform the same processing.

Figure 10:
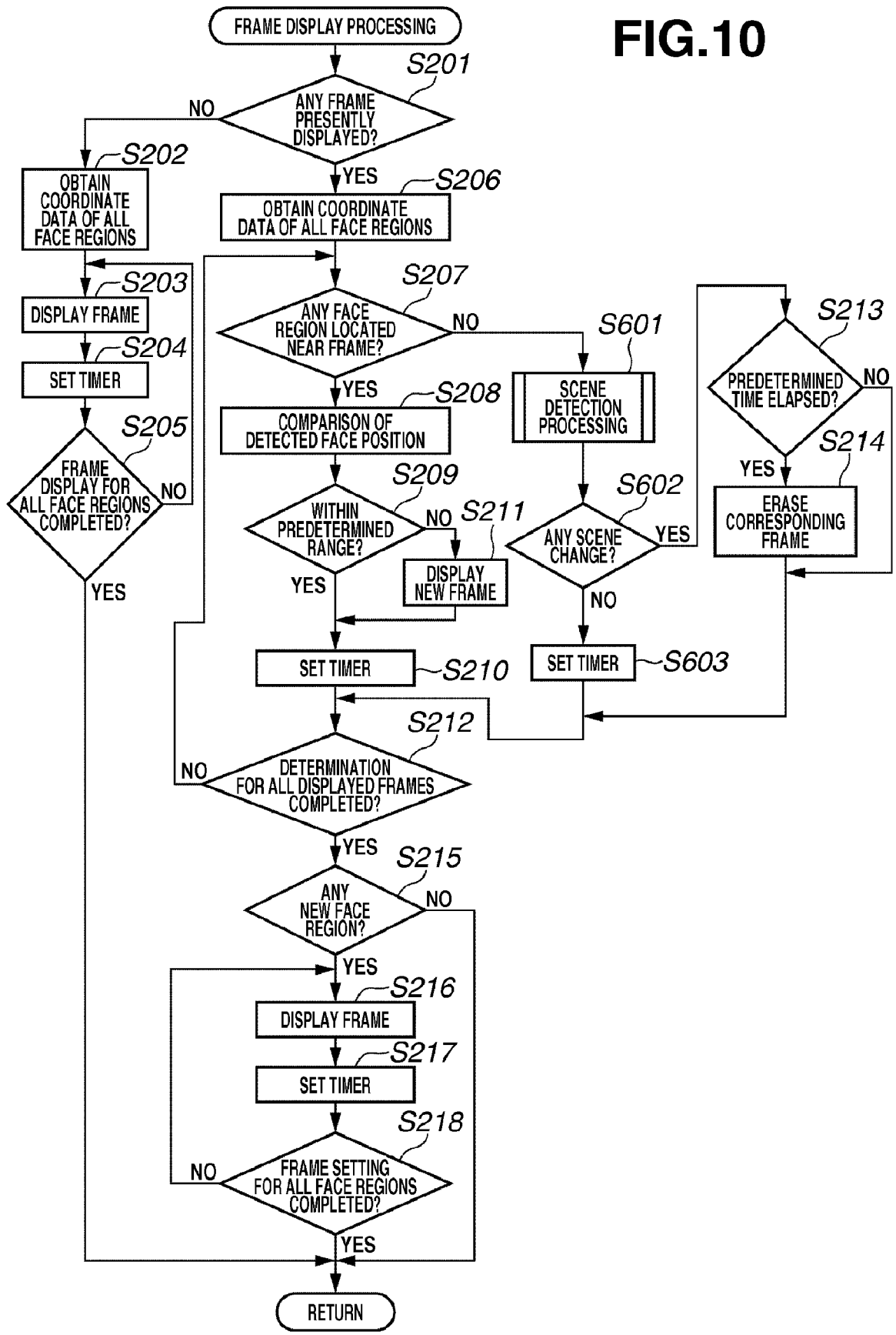
FIG. 10 is a flowchart showing an exemplary frame display processing routine in accordance with a fourth exemplary embodiment of the present invention.

In step S207 of FIG. 10, the digital signal processing circuit 1007 selects one of face detection frames already displayed. Then, the digital signal processing circuit 1007 determines whether a selected face detection frame is present in the vicinity of any coordinate position of a face region newly obtained in step S206.

When the selected face detection frame is not present in the vicinity of any coordinate position of a newly obtained face region, the processing flow proceeds to step S601. In step S601, the digital signal processing circuit 1007 executes scene detection processing for determining whether the situation of a subject has changed.

Figure 7B:
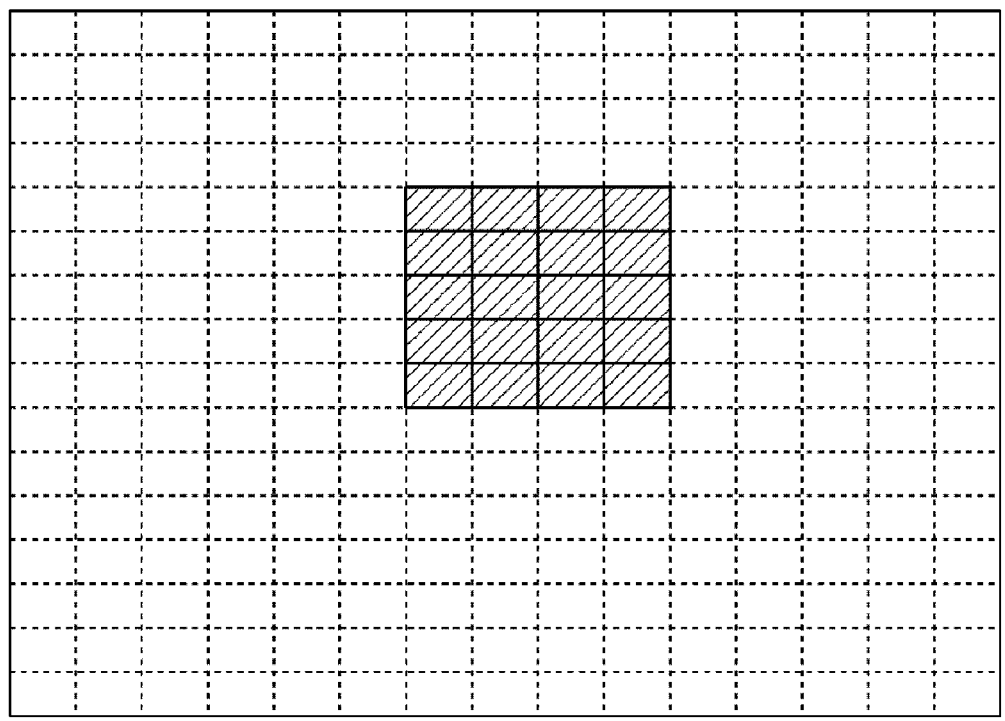
FIG. 7B is a view showing an exemplary relationship between the face detection frame and dissected regions in accordance with an aspect of the present.
Figure 11:
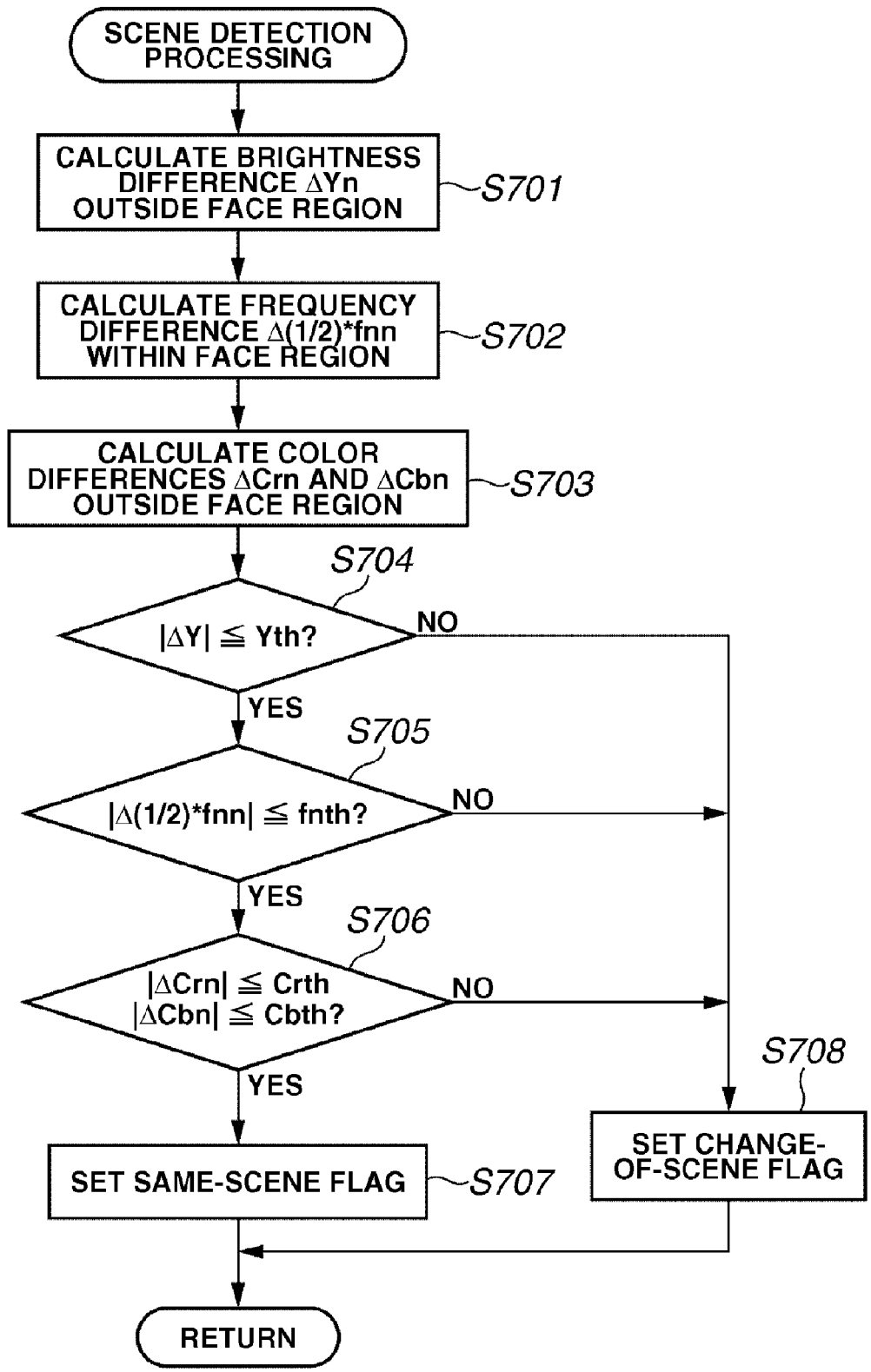
FIG. 11 is a flowchart showing an exemplary scene detection processing routine in accordance with the fourth embodiment of the present invention.

FIG. 11 is a flowchart showing details of the scene detection processing, which can be described with reference to dissected regions shown in FIGS. 7A and 7B. FIG. 7A is a display screen of the display unit 1010, and FIG. 7B shows dissected regions of the imaging element 1003. In FIG. 7B, chain lines represent boundaries of dissected regions. To make it easy to understand the following description, FIG. 7A shows chain lines similar to those of FIG. 7B. In FIG. 7B, a shaded region represents a group of dissected regions where the face detection frame of FIG. 7A is present.

In FIG. 11, in step S701, the digital signal processing circuit 1007 detects a brightness signal of each dissected region where the face detection frame is not present (i.e., each non-shaded region in FIG. 7B). Then, the digital signal processing circuit 1007 compares the detected brightness signal with a brightness signal obtained from a corresponding region of image data when the timer 1015 is previously reset to an initial value, and calculates a difference $\Delta Yn$ between the compared signals.

In step S702, the digital signal processing circuit 1007 converts the image data of each dissected region where the face detection frame is present, into a specific frequency (i.e., $(1/2)*fnn$ representing a half of the Nyquist frequency according to the present exemplary embodiment). Then, the digital signal processing circuit 1007 compares the converted frequency with a frequency obtained according to a similar method from a corresponding region of image data when the timer 1015 is previously reset to an initial value, and calculates a difference $\Delta(1/2)*fnn$ between the compared frequencies.

In step S703, the digital signal processing circuit 1007 detects a color difference signal in each dissected region where the face detection frame is not present. Next, the digital signal processing circuit 1007 compares the detected color difference signal with a color difference signal obtained from a corresponding region of image data when the timer 1015 is previously reset to an initial value, and calculates differences $\Delta Crn$ and $\Delta Cbn$ between the compared color difference signals.

Then, in step S704, the digital signal processing circuit 1007 determines whether the difference $\Delta Yn$ calculated in step S701 is less than or equal to a threshold Yth. If the difference $\Delta Yn$ calculated in step S701 is less than or equal to a threshold Yth, the process flow proceeds to step S705. If the difference $\Delta Yn$ calculated in step S701 is not less than or equal to a threshold Yth, the process flow proceeds to step S708.

Then, in step S705, the digital signal processing circuit 1007 determines whether the difference $\Delta(1/2)*fnn$ calculated in step S702 is less than or equal to a threshold fnth. If the difference $\Delta(1/2)*fnn$ calculated in step S702 is less than or equal to a threshold fnth, the process flow proceeds to step S706. If the difference $\Delta(1/2)*fnn$ calculated in step S702 is not less than or equal to a threshold fnth, the process flow proceeds to step S708.

Next, in step S706, the digital signal processing circuit 1007 determines whether the differences $\Delta Crn$ and $\Delta Cbn$ calculated in step S703 are less than or equal to thresholds Crth and Cbth, respectively. If the differences $\Delta Crn$ and $\Delta Cbn$ calculated in step S703 are less than or equal to thresholds Crth and Cbth, respectively, the process flow proceeds to step S707. If the differences $\Delta Crn$ and $\Delta Cbn$ calculated in step S703 are not less than or equal to thresholds Crth and Cbth, respectively, the process flow proceeds to step S708. Further, it is noted that in this case, the thresholds Yth, fnth, Crth, and Cbth can be experimentally obtained and can be used to determine whether a subject remains on a screen.

As a result, when all conditions of steps S704 through S706 are satisfied, the digital signal processing circuit 1007 decides that a change having occurred in the situation of a subject is small regardless of failure in the face detection. Thus, in step S707, the digital signal processing circuit 1007 sets a flag indicating no scene change.

On the contrary, when any one of the conditions is not satisfied, the digital signal processing circuit 1007 decides that a change having occurred in the situation of a subject is not small. Thus, in step S708, the digital signal processing circuit 1007 sets a flag indicating a scene change. After setting either flag, the digital signal processing circuit 1007 terminates this routine.

Returning to FIG. 10, the digital signal processing circuit 1007 determines in step S602 whether the flag indicating a scene change is set. When the flag indicating a scene change is set (YES in step S602), the processing flow proceeds to step S213. On the contrary, when the flag indicating a scene change is not set (NO in step S602), the processing flow proceeds to step S603. In step S603, the timer sets an initial value and starts measuring a display time. Then, the processing flow proceeds to step S212.

It is noted that if the flag indicating a scene change is set, the situation change of a subject will not be small and the face detection frame of a subject may deviate from the head of a subject. Therefore, in step S213, the digital signal processing circuit 1007 determines whether the count value of the timer 1015 has reached the predetermined time. When the timer count value has already reached the predetermined time, the processing flow proceeds to step S214 to erase the face detection frame displayed on the display unit 1010.

If the flag indicating a scene change is not set, the situation change of a subject will be small. More specifically, when a subject person blinks and closes an eye, or suddenly turns his/her face to look away, the face detection probably results in failure. Therefore, regardless of failure in the face detection, it is proper to presume that the position of a subject head does not change largely. Thus, the already displayed face detection frame is continuously displayed.

It is however possible to immediately erase the face detection frame when the face detection is failed and when the situation change of a subject is not small according to the scene detection processing. In this case, the timer can be omitted.

Furthermore, the reference values used for setting the scene change flag in the present exemplary embodiment are the difference (i.e., $\Delta Yn$) in the brightness signal, the difference (i.e., $\Delta(1/2)*fnn$) in the converted specific frequency, and the difference (i.e., $\Delta Crn$ and $\Delta Cbn$) in the color difference signal, in respective dissected regions. However, it can be adequately determined whether all or part of these signals are used as reference values for the decisions (determinations).

Furthermore, when these differences are obtained, it is possible to obtain a difference of signals in each of the dissected regions. Alternatively, it is possible to average the signals obtained in plural or all dissected regions, or give weighting factors to the signals.

Furthermore, another method can be used to perform the scene detection processing. First, the AE processing, AF processing, or AWB processing can be performed in the stage of performing the through display before an ON state of the shutter switch SW1 is detected in step S114.

Then, the brightness value, focused state, white balance information obtained based on image data for the through display can be compared with target reference values. To compensate the differences in these factors, the conventional AE processing, AF processing, or AWB processing can be performed.

In the scene detection processing (refer to step S601), the digital signal processing circuit 1007 can obtain compensated amounts for the AE processing, AF processing, and AWB processing which are calculated based on image data obtained for the through display.

Then, these compensated amounts can be compared with thresholds. When all or at least one of the compensated amounts exceeds the threshold(s), the situation change of a subject can be decided as not small and the flag indicating a scene change can be set.

Furthermore, the information used for the scene detection decisions (determinations) are not limited to signals obtainable from the image data captured by the imaging apparatus 1000. For example, signals produced from a shake detection circuit or a posture detection circuit installed on the imaging apparatus 1000 can be used as reference values for the decisions.

Furthermore, a specific signal representing a user's operation entered through an operating member of the imaging apparatus 1000 or a predetermined signal transmitted from an external apparatus can be used as reference values for the decisions.

As described above, according to the fourth exemplary embodiment, when the situation change of a subject is small, the face detection frame can be continuously displayed and the timer can be reset regardless of failure in the face detection.

More specifically, in a case that the situation change of a subject is small regardless of failure in the face detection, the display time of the face detection frame can be increased compared with other cases.

Accordingly, the present exemplary embodiment can prevent the face detection frame from being erased when a subject person blinks and closes an eye or turns his/her face to look away. As a result, the fourth exemplary embodiment can suppress an undesirable phenomenon repeating the display and erasure of the face detection frame in a short period of time.

Fifth Exemplary Embodiment

A fifth exemplary embodiment of the present invention will be described below. The fifth exemplary embodiment is different from other exemplary embodiments in the contents displayed on display unit 1010 when the situation change of a subject is small according to the result of the scene detection processing.

Figure 12A:
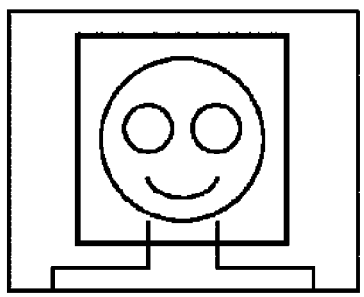
FIGS. 12A through 12F are views each illustrating an exemplary display pattern of the face detection frame in accordance with a fifth exemplary embodiment of the present invention.
Figure 12B:
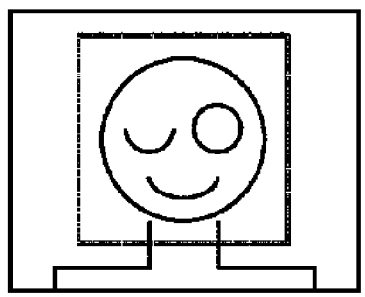
Figure 12C:
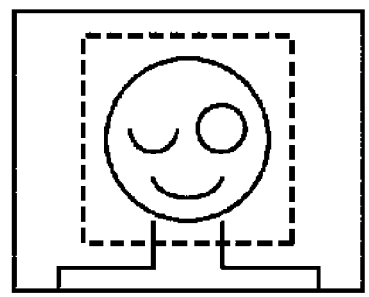
Figure 12D:
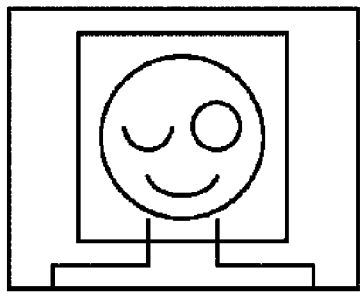
Figure 12E:
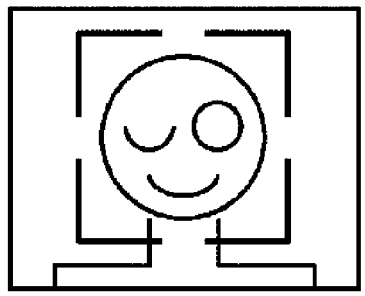
Figure 12F:
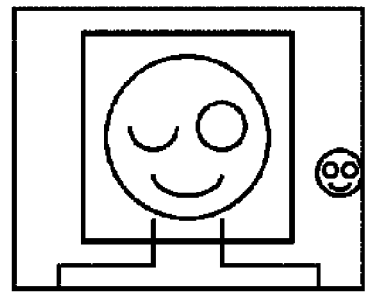

FIGS. 12B through 12F show various patterns of the face detection frame displayed when the situation change of a subject is assumed to be small according to the scene detection processing. FIG. 12A shows an ordinary pattern of the face detection frame displayed when the face detection is successful. FIG. 12B shows a face detection frame changed in color, or displayed in a semitransparent state. FIG. 12C shows a face detection frame displayed as a dot image, or displayed according to a predetermined flickering mode. FIG. 12D shows a face detection frame with a thin line. FIG. 12E shows a face detection frame displayed in part, or in a predetermined cutout state. FIG. 12F shows a face detection frame displayed together with an icon.

In this manner, when the situation change of a subject is assumed to be small regardless of failure in the face detection, the face detection frame can be displayed for a while with a specific display pattern so as to let a user recognize the result of failure in the face detection, without immediately erasing the face detection frame.

Accordingly, when a subject person blinks and closes an eye, or suddenly turns his/her face to look away, the change in the display pattern of the face detection frame can be reduced so as to assure the visibility of the screen.

Figure 13:
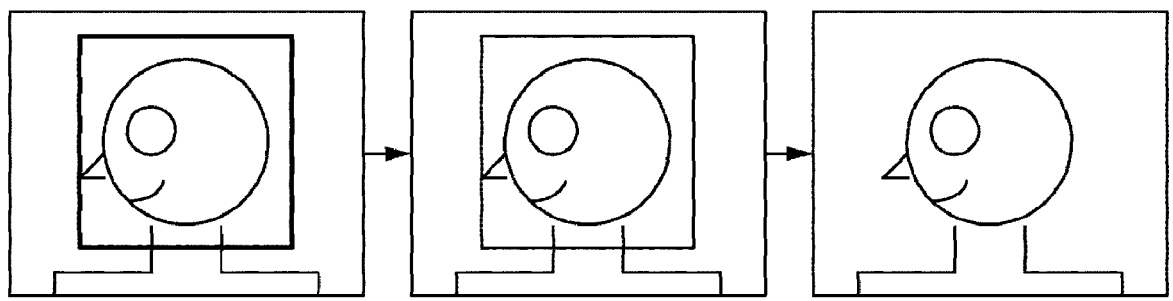
FIG. 13 is a view illustrating an exemplary display pattern of the face detection frame in accordance with a modified embodiment of the fifth embodiment of the present invention.
Figure 14:
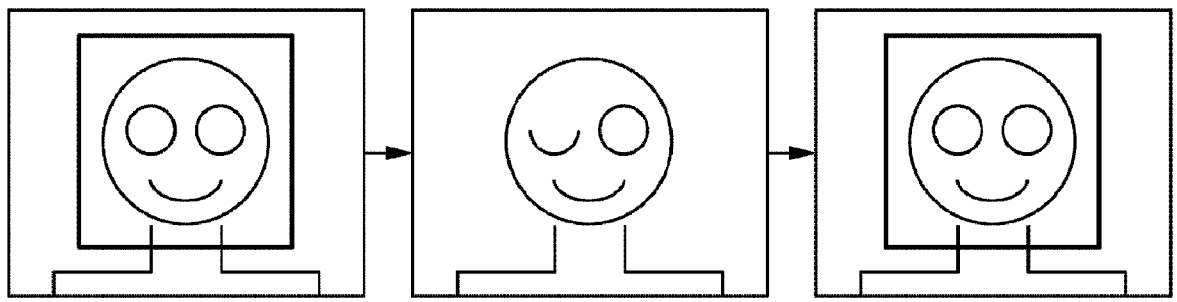
FIG. 14 is a view illustrating a display pattern of a conventional face detection frame.
Figure 14:
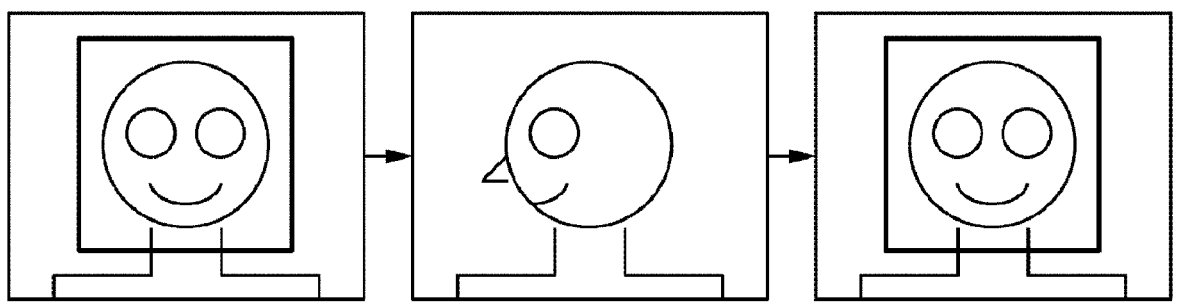

FIG. 13 shows a modified embodiment of the present exemplary embodiment. When the result of the scene detection processing shows that the situation change of a subject remains small for a while, it is desirable to use a multi-stage display that can change the state of the face detection frame stepwise before it is finally erased.

Even when the situation change of a subject remains small, it is undesirable that the face detection is unfeasible for a long time. Hence, according to the modified embodiment, even when a subject person blinks and closes an eye or suddenly turns his/her face to look away, the state of the face detection frame changes stepwise each time a predetermined time elapses and finally disappears as shown in FIG. 13. Accordingly, if the face detection is failed, the face detection frame will be erased depending on an elapsed time, even when the situation change of a subject is assumed to be small.

According to the above-described exemplary embodiments, a pair of eyes, a nose, and a mouth are detected and a human face region is determined based on their relative positions. However, the method for identifying a main subject through the face detection processing is not limited to the disclosed example.

Other Exemplary Embodiments

As described above, it is possible to perform the face detection processing by using a neural network or other method for analyzing a face region based on a learning technique. Furthermore, the method for detecting a main subject is not limited to the face detection processing. The main subject may not be a mankind. For example, the main subject can be an animal, a plant, a building, or a geometric pattern.

Instead of employing the above-described exemplary embodiment, any other exemplary embodiment can be used to obtain comparable effects in assuring a fine display regardless of temporary failure in the detection of a desired subject, if it can provide the above-described functions of detecting a desired subject and displaying the position of a detected subject.

Furthermore, according to the above-described exemplary embodiments, the imaging apparatus 1000 detects a main subject during the through display of the subject. However, the present invention is not limited to the disclosed example.

For example, another exemplary embodiment of the present invention can possess the capability of transferring image data obtained in the imaging apparatus to an external device, causing a display unit of the external device to display the image data, and causing the external device to detect a main subject.

Furthermore, image data can be a movie already recorded in a storage medium or device if it is readable. Namely, another exemplary embodiment of the present invention can provide functions of repetitively detecting an object satisfying specific conditions from continuously changing image data and realizing the display reflecting detection results.

The above-described flowcharts can be realized by program codes when a computer operates under the program(s) stored in a RAM or ROM. In this respect, an exemplary embodiment of the present invention can include the program (s) and a storage medium of the program(s) readable by a computer.

More specifically, the program(s) can be recorded into, for example, a CD-ROM or other recording medium, or can be supplied to a computer via various transmission media. The record medium storing the program(s) can be selected from any one of flexible disk, hard disk, optical disk, magneto-optical disk, MO, CD-ROM, CD-R, CD-RW, magnetic tape, nonvolatile memory card, ROM, and DVD (DVD-ROM, DVD-R).

Furthermore, the transmission medium of the program(s) can be a computer network (e.g., LAN, or WAN represented by Internet) that can supply carriers of program information.

Furthermore, the transmission medium of the program(s) can be a communication medium (e.g., an optical fiver or other cable line, or a wireless line) used in a wireless communication network system.

When a computer reads and executes the installed program (s), the functions of the above-described exemplary embodiments can be realized.

Furthermore, based on an instruction of the program(s), the operating system (or other application software) running on the computer may execute part or all of the processing so that the functions of the above-described exemplary embodiments can be realized.

Furthermore, the program(s) read out of a recording medium can be written into a memory of a feature expansion board equipped in a computer or into a memory of a feature expansion unit connected to the computer. In this case, based on an instruction of the program, a CPU provided on the feature expansion board or the feature expansion unit can execute part or all of the processing so that the functions of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed:

1. An image processing apparatus comprising: a display unit configured to display an image by using image data;
   a detection unit configured to detect an object satisfying predetermined conditions from the image data and find coordinates of the object; and
   a control unit configured to display a detection result indicating a region where the object is detected by overlapping the image based on the coordinates of the object, on the display unit,
   wherein, in case none of the object which can be regarded identical as the object existed in the region indicated in the detection result can be detected while displaying the detection result, the control unit continues to display the detection result based on the coordinates of the object while detecting the object on the display unit when satisfying at least the predetermined condition that the change amount of the image data in response to the update of the image data does not exceed the threshold, and the control unit cancels the display of the detection result on the display unit when the predetermined conditions are not satisfied.

2. The image processing apparatus according to claim 1, wherein the change amount of the image data is at least one of the change amount of luminance signal of the image data, particular frequency component of the image data, or color-differences signal of the image data.

3. The image processing apparatus according to claim 1, wherein the change amount of the image data is defined as compensated amounts for an auto-focus processing obtained from the image data, the compensated amounts for an automatic exposure processing obtained from the image data and the compensated amounts for an auto white balance processing obtained from the image data.

4. The image processing apparatus according to claim 1, wherein the change amount of the image data is the amount in the region where the object is detected.

5. The image processing apparatus according to claim 1, in case none of the object which can be regarded identical as the object existed in the region indicated in the detection result can be detected while displaying the detection result, the control unit continues to display the detection result based on the coordinates of the object while detecting the object on the display unit when the change amount of the image data in response to the update of the image data does not exceed the threshold and the time during the image which can be regarded identical as the object existed in the region indicated in the detection result cannot be detected, does not reach the predetermined time.

6. The image processing apparatus according to claim 1, further comprising an image pickup device converting light flux as a subject image into the image data.

7. The image processing apparatus according to claim 6, further comprising:
   a focus control unit configured to execute auto-focus processing against the object detected by the detection unit; and
   an exposure control unit configured to execute automatic exposure processing.

8. The image processing apparatus according to claim 1, wherein the object satisfying predetermined conditions is a shape of a human face.

9. A method for image processing, comprising steps of:
   displaying an image by using image data;
   detecting an object satisfying predetermined conditions from the image data and find coordinates of the object; and
   displaying a detection result indicating a region where the object is detected by overlapping the image based on the coordinates of the object on the display unit,
   wherein, in case none of the object which can be regarded identical as the object existed in the region indicated in the detection result can be detected while displaying the detection result, the control unit continues to display the detection result based on the coordinates of the object while detecting the object on the display unit when satisfying at least the predetermined condition that the change amount of the image data in response to the update of the image data does not exceed the threshold, and the control unit cancels the display of the detection result on the display unit when the predetermined conditions are not satisfied.

* * * * *